United States Patent
Masuda et al.

(10) Patent No.: US 7,328,020 B2
(45) Date of Patent: Feb. 5, 2008

(54) MOBILE-SERVICE SWITCHING CENTER, BASE STATION CONTROLLER, MULTICALL COMMUNICATION MODE SUPPORTING TERMINAL AND METHOD OF CHANGING NUMBER OF CALLS IN MULTICALL COMMUNICATION MODE

(75) Inventors: Hiroyo Masuda, Kawasaki (JP); Keiko Mamiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 316 days.

(21) Appl. No.: 11/264,462

(22) Filed: Nov. 1, 2005

(65) Prior Publication Data

US 2006/0058060 A1    Mar. 16, 2006

Related U.S. Application Data

(62) Division of application No. 09/751,974, filed on Dec. 29, 2000, now Pat. No. 7,006,827.

(30) Foreign Application Priority Data

Apr. 19, 2000   (JP) .............................. 2000-118412

(51) Int. Cl.
*H04Q 7/20* (2006.01)
(52) U.S. Cl. ................... 455/439; 455/552.1; 455/567; 455/519; 379/433.1
(58) Field of Classification Search ..... 455/450–452.1, 455/436, 439, 553, 518, 519, 432.1, 414, 455/556.1, 567; 379/419, 433.1
See application file for complete search history.

(56) References Cited

U.S. PATENT DOCUMENTS

| | | | |
|---|---|---|---|
| 5,418,529 A | * | 5/1995 | De Luigi et al. .......... 340/7.52 |
| 5,602,910 A | * | 2/1997 | Tsutsui et al. ......... 379/212.01 |
| 6,198,929 B1 | | 3/2001 | Krishnamurthi et al. |
| 6,285,875 B1 | | 9/2001 | Alajoki et al. |

(Continued)

FOREIGN PATENT DOCUMENTS

JP    10-94022    4/1998

(Continued)

OTHER PUBLICATIONS

Japanese Office Action dated May 26, 2005.

*Primary Examiner*—Edward F. Urban
*Assistant Examiner*—Nhan T. Le
(74) *Attorney, Agent, or Firm*—Myers Wolin, LLC

(57) ABSTRACT

A method and apparatus of changing the number of calls in a multicall communication mode including detecting an occurrence of handover, transmitting a special message having inserted therein call-number changing information regarding the increase or decrease of a number of calls to a switching center as a connection destination connected by handover, transmitting the special message to inform a number of calls capable of being supported to a mobile terminal, receiving a reply regarding a desired call to be maintained selected from a plurality of calls, and rearranging the handover process so the desired call is maintained in connection while the call not desired is disconnected. Thereby allowing the user of the mobile terminal to select a desired call to be maintained when handover is executed under the congested state condition in the communication system which hinders smooth handover from one switching center to another.

1 Claim, 30 Drawing Sheets

EXAMPLE OF DISPLAY SCREEN OF TERMINAL FOR MENU SELECTION

U.S. PATENT DOCUMENTS

| | | | |
|---|---|---|---|
| 6,353,736 B1 * | 3/2002 | Hiromichi | 455/406 |
| 6,470,184 B1 | 10/2002 | Machida | |
| 6,526,282 B1 | 2/2003 | Kadoshima et al. | |
| 6,625,474 B1 * | 9/2003 | Bussan et al. | 455/563 |
| 6,658,266 B1 * | 12/2003 | Inokura et al. | 455/553.1 |
| 6,690,955 B1 * | 2/2004 | Komiyama | 455/566 |

FOREIGN PATENT DOCUMENTS

| | | |
|---|---|---|
| JP | 11-261717 | 9/1999 |
| JP | 2002-511723 | 4/2002 |
| WO | WO 99/53704 | 10/1999 |

* cited by examiner

EXAMPLE OF DISPLAY SCREEN OF TERMINAL FOR MENU SELECTION

EXAMPLE OF PROCESSING EFFECTED IN SWITCHING CENTER

HANDOVER REQUIRED : HANDOVER REQUEST 1
HANDOVER REQUEST ACK : ACKNOWLEDGEMENT OF HANDOVER REQUEST 2
HANDOVER COMMAND : HANDOVER EXECUTION COMMAND
HANDOVER COMPLETE : HANDOVER COMPLETION NOTIFICATION

EXAMPLE OF SIGNALING SEQUENCE

EXAMPLE OF PROCESSING OF SINGLE CALL

EXAMPLE OF PROCESSING EFFECTED ON THE SIDE OF MOBILE-SERVICE SWITCHING CENTER

EXAMPLE OF SIGNALING SEQUENCE

EXAMPLE OF PROCESSING EFFECTED IN BASE STATION CONTROLLER ON HANDOVER DISTINATION SIDE

EXAMPLE OF SIGNALING SEQUENCE

EXAMPLE OF PROCESSING EFFECTED ON THE SIDE OF MOBILE-SERVICE SWITCHING CENTER

EXAMPLE OF PROCESSING EFFECTED IN SWITCHING CENTER

EXAMPLE OF SIGNALING SEQUENCE

EXAMPLE OF PROCESSING EFFECTED IN SWITCHING CENTER

EXAMPLE OF PROCESSING EFFECTED
IN SWITCHING CENTER

EXAMPLE OF PROCESSING EFFECTED IN MOBILE-SERVICE SWITCHING CENTER AS SOURCE OF HANDOVER

EXAMPLE OF PROCESSING EFFECTED IN MOBILE-SERVICE SWITCHING CENTER

EXAMPLE OF CONNECTION SEQUENCE OF CATCH PHONE

EXAMPLE OF CONNECTION SEQUENCE OF MULTI-SESSION (MULTICALL)

MOBILE-SERVICE SWITCHING CENTER, BASE STATION CONTROLLER, MULTICALL COMMUNICATION MODE SUPPORTING TERMINAL AND METHOD OF CHANGING NUMBER OF CALLS IN MULTICALL COMMUNICATION MODE

CROSS-REFERENCE TO RELATED APPLICATION

This application is a divisional of U.S. application Ser. No. 09/751,974 filed on Dec, 29, 2000, now U.S. Pat. No. 7,006,827, which claims priority from Japanese Patent Application No. 2000-118412 filed Apr. 19, 2000, which is hereby incorporated by reference in its entirety.

BACKGROUND OF THE INVENTION (1) Field of the Invention

The present invention relates to a communication system in which a multicall (multi-call) communication mode is supported, and more particularly, the present invention relates to a mobile-service switching center, a base station controller, a multicall mode supporting terminal and a method of changing number of calls in multicall communication mode which are suitable for use in a multi-session control system for an interwork between a next-generation network and the existing network.

(2) Description of Related Art

In the existing ordinary telephone network and a mobile-service communication network, when one of a communication service in a voice signal communication, a packet communication or the like is realized, one mobile terminal occupies one line of communication traffic in the network.

FIG. 28 is an overall arrangement of a mobile-service communication system. As shown in FIG. 28, a mobile-service communication system 99 includes a mobile station (MS) 100 such as a portable telephone terminal or the like, a base station (BSS) 101a, 101b, a switching center 102a, 102b, a home location register (hereinafter referred to as HLR) 103, the public switched telephone network (hereinafter referred to as PSTN) 104a and the internet 104b.

The switching center 102a, 102b is known as a mobile-service switching center. The mobile-service switching center includes therein a visitor location register (hereinafter referred to as VLR). Thus, the mobile-service switching center is denoted as MSC/VLR. In this case, the VLR is a unit for temporarily holding generated data of a subscriber.

The HLR 103 is utilized for holding and managing data of the subscriber such as of a telephone number of the mobile station 100, registration of location of the subscriber, and authorization of the subscriber. These components of the communication system work in a cooperative manner so that a subscriber can be registered in his or her location wherever the subscriber with the mobile station is located. Further, owing to the cooperative work of these components, a call made from the mobile station 100 can be effectively found by the network.

In this way, the mobile station 100 can communicate with its opponent party with a voice signal through the base station 101b and the public switched telephone network 104a. Further, the mobile station 100 can carry out packet communication through the base station 101b and the internet 104b.

Incidentally, as a communication system for the next-generation, standard of IMT-2000 as the third generation mobile communication system includes a regulation of multicall mode communication in which a single mobile terminal can settle a plurality of communication channels at a time. Further, the standard of IMT-2000 also includes a regulation of multiconnection communication mode in which a single call is established by settling a plurality of communication links. According to the regulations of the standard of IMT-2000, a subscriber can transmit or receive text data while enjoying telephone conversation. Alternatively, the subscriber can transmit and receive an e-mail while transmitting video image to other person. By the way, the multisession communication mode (multicall communication mode) conceptually includes VoIP (Voice Over IP) in which voice data is converted into an IP packet and sent to its destination through the internet.

As one of available communication service scheme for connecting a single mobile terminal to a plurality of calls, there has been proposed a so-called "catch-phone" (service name). This communication service scheme is different from the multicall communication mode. The difference between the multisession and the communication service scheme named catch-phone will hereinafter be described with reference to FIGS. 29 and 30.

FIG. 29 is a diagram showing an example of connection sequence of the catch phone. As shown in FIG. 29, a subscriber, base station controller, a switching center, and subscribers as connection destinations 1 and 2 take statuses of S1, S4, S5, S7, S8 and exchange messages of S2, S3, S6 among them. Initially, when the subscriber and the connection destination 1 occupy a communication line (status attached with notation S1), the other subscriber as a connection destination 2 makes a call to the subscriber (status S2: calling request). Thereafter, the subscriber transmits a message of connection hold request S3 regarding the connection destination 1 to the switching center. In this way, the call from the connection destination 1 is brought into a hold mode (status S4) while the subscriber goes to a communication mode with the connection destination 2 (status S5). Further, the subscriber transmits message S6 to the switching center so that the connection destination 2 is brought into the hold mode (status S7) while the subscriber goes to the communication mode with the connection destination 1 (status S8).

As described above, according to the communication service scheme of the catch phone, since a call is temporarily held at the switching center, the communication line settled between the mobile terminal and the switching center is not more than a single line.

FIG. 30 is a diagram showing an example of connection sequence when the multisession communication mode is taken place in the communication service network. As shown in FIG. 30, the connection sequence includes three statuses T1 to T3 and Message T2. If a connection destination 2 makes a call to the subscriber with Calling Request Message T2 when the subscriber and the connection destination 1 of FIG. 30 occupy a communication line (status T1), then the subscriber goes to a communication mode with the connection destination 2 (status T4) while the communication line with the connection destination 1 is maintained (status T3).

As described above, according to the multisession communication mode, a plural number of communication lines can be settled between the mobile terminal and the switching center.

Further, according to the third generation of mobile communication system, it is essentially requested to establish a technology of handover between a network based on the IMT-2000 standard and the existing network. The term handover section that, for example, when a mobile station in a vehicle is moving from one cell to another, a new communication traffic is established to continue the call with the mobile terminal. If any proprietary network employs a communication system based on the IMT-2000 standard, how the number of calls busy in communication should be handled is a critical problem.

Japanese Patent Laid-Open (Kokai) HEI 11-261717 (hereinafter referred to as a prior-art reference) discloses a technology relating to an improvement in transmission work efficiency in a communication system when image data (photograph data) photographed at a local place is once taken into a mobile terminal and sent to an office or the like by means of a communication equipment such as a mobile terminal and so on.

However, according to the above conventional technology, when the multicall communication mode is effected, and handover process is requested or a congesting state of the network is fluctuated, causing that only a single call becomes allowable to continue, then the network side arbitrarily selects a call to be continued and other calls are discarded. Thus, there is no allowance for the subscriber to select a call to be continued.

Therefore, if the network is placed under a state that only a single call can be supported and the switching center receives a call connection request under the congesting state, the switching center disconnects a call (if present) with a priority lower than the priority of the call corresponding to the call connection request, and the switching center selects a call of a relatively high priority from newly requested calls to provide a connection service. Accordingly, if there is no call with a low priority to be replaced with the newly requested call, the switching center has no choice other than to refuse the new connection request.

Further, according to the conventional technology, although emergency calls such as a police call, a fire station call, an ambulance call and soon are managed in terms of priority at every subscriber, a plurality of potential calls made by each subscriber were not managed in terms of priority. Furthermore, since the multicall communication mode as a communication service scheme is still not widely deployed, the matter relating to the multicall communication mode has not been sufficiently discussed.

In addition, the above-introduced prior art reference discloses merely a technology in which two sets of communication equipment such as a mobile terminal and a PHS (Personal Handy-phone System) are connected to each other and made allowable to communicate at a time, whereby data can be transmitted to a single destination office by using two channels of network at a time. Accordingly, the technology of the reference cannot support the multicall communication mode, and hence the technology does not support a function for restoring the number of calls that were once obliged to reduce due to a network problem or the like.

SUMMARY OF THE INVENTION

The present invention is made in view of the above aspect. Therefore, an object of the present invention is to provide a switching center apparatus, a base station controller, and a multicall communication mode supporting terminal for use in a multicall communication mode or a multisession communication mode in which a subscriber makes a telephone call while making his or her data terminal equipment be connected to the internet, wherein if the current maintained communication mode is requested to change into a single call communication mode or current settled number of calls are requested to reduce a number of calls less than the current continued number due to a change of communication environment, the network management side informs the subscriber of the requested change or the requested reduction of call-numbers so as to make the subscriber change the number of calls, or the network management side manages the relative priority of the calls for each of the plurality of calls continued by the subscriber so as to make the subscriber select a desired call. Owing to the merit deriving from the invention, it becomes possible to make the multicall communication service be widely available.

In view of the above aspect, there is provided a mobile-service switching center including determining section for determining whether a call request is a call from a first multicall communication mode supporting terminal which is capable of supporting a plurality of calls at a time or a call from a single-call mode supporting terminal which is capable of supporting only a single call at a time, event detecting section for detecting event caused by a handover occurrence or fluctuation of congesting state, and call-number changing section capable of changing the number of calls to continue which are supported by the first multicall mode supporting terminal, when the first multicall communication mode supporting terminal identified by the determining section carries out communication and the event detecting section detects any event during the communication.

According to the above arrangement, if the subscriber makes a telephone call while making his or her data terminal equipment be connected to the internet, and the multicall communication mode is requested to change into a single call communication mode or the number of calls are requested to reduce to a number less than currently continued number of calls due to necessity of handover operation or fluctuation of congesting state of the network, a communication line which is desired by the subscriber can be maintained.

According to the present invention, the call-number changing section may be arranged to include special message notifying section capable of transmitting a special message having inserted therein call-number changing information regarding the increases and decreases of the number of calls, to a base station controller for controlling a base station and the first multicall communication mode supporting terminal, reply receiving section for receiving reply regarding a call to be maintained which is selected from the plurality of calls notified by the special message notifying section by the first multicall mode supporting terminal, and handover rearranging section for rearranging the connection status in such a manner that the desired call to continue which is designated in the reply received by the reply receiving section is maintained and an undesired call which is not selected by the first multicall communication mode supporting terminal is disconnected.

Further, according to the present invention, the call-number changing section may be arranged to include call selecting section for selecting a call to be disconnected from the plurality of calls under communication in accordance with a predetermined algorism, call disconnect notifying section for notifying the first multicall communication mode supporting terminal corresponding to the disconnected call selected by the call selecting section of a call disconnect message, reply receiving section capable of receiving reply regarding a desired call to continue selected by the first multicall communication mode supporting terminal notified by the call disconnect notifying section, and handover rearranging section for rearranging the handover in such a manner that the desired call to continue designated by the reply received by the reply receiving section is maintained in connection and an undesired call to continue designated from the plurality of calls by the first multicall communication mode supporting terminal is disconnected.

According to the present invention, the call selecting section may be arranged to include priority data holding section for assigning priority data indicative of priority of call under communication to each of the call to be disconnected and holding the priority data, output section for outputting the data designating the call to be disconnected based on the priority data held by the priority data holding section when connection service restriction deriving from the event is relaxed. Further, the call selecting section may be arranged so that the call to be disconnected is selected based on information regarding priority of call contained in a predetermined region of the call disconnect message. Furthermore, the call selecting section may be arranged so that the call to be disconnected is selected based on information contained in the subscriber's data which is sent from a home location register to a visitor location register.

According to the present invention, the call selecting section may be arranged so that the call to be disconnected is selected based on a selecting algorism provided for each subscriber. Further, the selecting algorism may be arranged based on the sequence of connection service provided to the plurality of calls under communication, and the call selecting section selects a desired call to continue in accordance with the selecting algorism. Furthermore, the selecting algorism may be arranged based on data indicative of quality of service of the transmitted signal, and the call selecting section selects a call to be continued in accordance with the selecting algorism.

In addition, the call-number changing information is arranged to take a variety of statuses in a step-like fashion so as to indicate the increases and decreases of the number of calls, and the special message notifying section is arranged to make the first multicall communication mode supporting terminal emanate an alarming sound so that the sound property varies step by step so as to correspond to the status taken by the call-number changing information.

If the call-number changing information is arranged as described above and the special message notifying section is also arranged as described above correspondingly, the subscriber will have an initiative in selecting a call to continue, with the result that a plurality of calls can be managed properly for each of the subscribers. Thus, the communication serve based on the multicall mode will be widely deployed.

According to the present invention, there is provided a base station controller including holding section capable of holding a plurality of calls communicating with each of base stations located near the base station controller at a time, detecting section for detecting at least a status that a handover is requested and determining a status that all of the calls held by the holding section cannot be handled upon handover in the multicall mode based on the number of calls held by the holding section, notifying section for transmitting a special message regarding the number of calls allowable to continue upon executing the process of handover, to the multicall communication mode supporting terminal requesting the handover which is detected by the detecting section, reply receiving section capable of receiving a reply containing data indicative of desired call to be continued which the multicall mode supporting terminal selects from the plurality of calls notified by the notifying section, and transmitting section for transmitting the data indicative of desired call to be continued received by the reply receiving section to a mobile-service switching center.

According to the above arrangement of the base station controller, even if the switching center suffers from a congesting state and there is no low priority call to be replaced with a newly requested call, the base station controller can find a vacant communication line for connection for the newly requested call, with the result that the vacant communication line is assigned to the new call requested by its subscriber. Thus, the quality of service provided to the subscriber will be improved.

According to the present invention, there is provided a multicall mode supporting terminal including receiving section for receiving a special message regarding the increases and decreases of a plurality of calls and extracting call-number change information from the special message, presenting section for presenting the plurality of calls under communication to the user of the multicall communication mode supporting terminal in a visual manner or an audible manner in accordance with the call-number change information extracted by the receiving section, input section arranged to permit the user of the multicall mode supporting terminal to carry out input operation for selecting a desired call to continue from the plurality of calls informed by the presenting section, and transmitting section for transmitting information regarding the desired call to continue designated by the input section to a corresponding base station.

According to the above arrangement of the multicall communication mode supporting terminal, if the subscriber makes a call in the multicall communication mode, and the multicall communication mode is requested to change into a single call communication mode, or the number of calls are requested to reduce to a number less than currently continued number of calls due to necessity of handover operation or fluctuation of congesting state of the network, a communication line which is desired by the subscriber can be maintained.

According to the present invention, there is proposed a method of changing the number of calls in a multicall communication mode for use in a switching center system which includes a first multicall communication mode supporting terminal for transmitting and receiving a radio signal, a base station controller for controlling a base station, and a mobile-service switching center for transmitting and receiving information regarding a plurality of calls so that a communication status is settled between the first multicall communication mode supporting terminal and the base station controller. The method is arranged to include a step of detecting an event caused by occurrence of handover and fluctuation in congesting state of a network, a step of transmitting a special message having inserted therein call-number changing information regarding the increases and decreases of call-numbers to a switching center as a connection destination connected by handover when the event is detected at the event detecting step, a step of receiving a reply regarding a desired call to continue selected by the first multicall communication mode supporting terminal from the plurality of calls notified by the special message created at the special message notifying step, and a step of rearranging the handover in such a manner that the desired call to continue designated by the reply received at the reply receiving step is maintained in connection and an undesired call to continue not selected from the plurality of calls by the first multicall mode supporting terminal is disconnected.

According to the above method of the present invention, if the subscriber makes a call in the multicall communication mode, and the multicall communication mode is requested to change into a single call communication mode or the number of calls are requested to reduce to a number less than currently continued number of calls due to necessity of handover operation or fluctuation of congesting state of the network, a communication line desired by the subscriber can be maintained.

Further, the special message notifying step may be arranged such that if the mobile-service switching center receives a message of call generating request sent from a second multicall mode supporting terminal other than the first multicall mode supporting terminal, then the mobile-service switching center inserts call-number decreasing information for decreasing the number of calls into the special message and transmits the special message to the second multicall mode supporting terminal, and the handover rearranging step may be arranged such that the mobile-service switching center transmits a reply against the call generation request by using a communication line which becomes vacant by the process of call-number decimation designated at the special message notifying step.

Further, the special message notifying step may be arranged to include a step of notifying the base station controller of information regarding the base station controller as a connection destination to be connected by the handover, a step of receiving call-number changing information regarding the number of calls allowable to continue which is notified at the base station controller notifying step and which is transmitted from the base station controller as a connection destination, and a step of transmitting the call-number changing information received at the call-number changing information receiving step, to the first multicall communication mode supporting terminal.

According to the above arrangement, the subscriber will have an initiative in selecting a call to be continued, with the result that a plurality of calls can be managed properly for each of the subscribers. Thus, the communication service based on the multicall communication mode will be widely deployed.

Further, according to the present invention, there is provided a method of changing the number of calls in a multicall communication mode for use in a switching system which comprises a first multicall mode supporting terminal for transmitting and receiving a radio signal, a base station controller for controlling a base station, and a mobile-service switching center for transmitting and receiving information regarding a plurality of calls that should be settled in a communication mode between the first multicall mode supporting terminal and the base station controller. The method is arranged to includes a first transmitting step for transmitting a handover request from the mobile-service switching center to a mobile-service switching center as a connection destination to be connected by the handover, a second transmitting step for returning a message containing data indicative of a number of calls allowable to continue based on the capacity and the congesting state of the mobile-service switching center as a connection destination, from the mobile-service switching center as a connection destination, in response to the handover request sent at the first transmitting step, a call-number notifying step for transmitting a message indicative of an additional call allowable to continue from the mobile-service switching center to the first multicall communication mode supporting terminal, if the number of calls allowable to continue contained in the message sent at the second transmitting step is larger than the current number of calls supported by the first multicall communication mode supporting terminal.

According to the above method, the information indicative of the priority of call can be sent or received without changing the existing message format. Therefore, the method can be utilized for general-purpose communication and the scalability will be improved.

Further, in the above method, the call-number notifying step may be arranged such that the mobile-service switching center further transmits a command message to the first multicall communication mode supporting terminal which is obliged to decrease the number of calls to continue so that a connection status is rearranged in accordance with the decreased number of calls allowable to continue.

Furthermore, in the above method, the call-number notifying step may be arranged such that if an event caused by occurrence of handover and fluctuation in congesting state of a network is detected, with the result that it becomes impossible to carry out handover while maintaining the current connection service status, then the mobile-service switching center notifies the first multicall communication mode supporting terminal that it is impossible to carry out handover while maintaining the current connection service status.

According to the above arrangement of the call-number notifying step, if the data transfer rate becomes small under a packet communication environment, the subscriber is informed that it is impossible to carry out handover while maintaining the current connection service status. Thus, an unpredictable communication trouble can be avoided.

BRIEF DESCRIPTION OF THE DRAWINGS

FIG. 9($b$) is a diagram showing a function block of call-number changing section according to a fourth embodiment of the present invention;

DESCRIPTION OF THE PREFERRED EMBODIMENTS

Embodiments of the present invention will hereinafter be described with reference to the attached drawings.

(A) Description of a First Embodiment of the Present Invention

Figure 1:
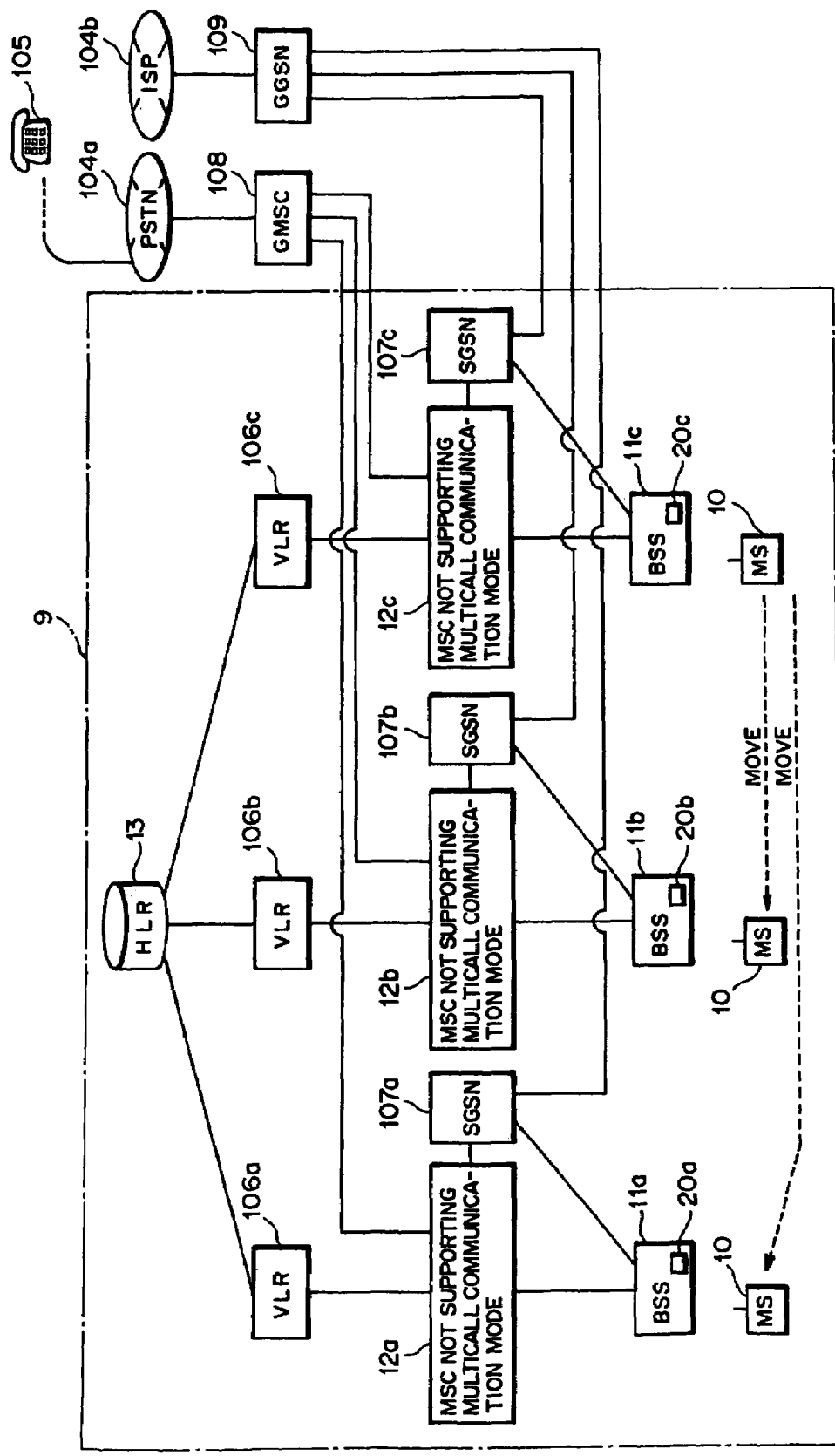
FIG. 1 is a diagram showing an arrangement of a mobile communication system according to a first embodiment of the present invention.

FIG. 1 is a diagram showing a mobile communication system (exchanger system) according to the first embodiment of the present invention. A mobile communication system 9 shown in FIG. 1 is a mobile communication system based on an IMT-2000 standard. The mobile communication system 9 includes a mobile station 10, base stations (BSS) 11a to 11c, switching centers (switching center apparatus) 12a to 12c, VLR 106a to 106c, an HLR 13, and packet processors (SGSN: Serving General Packet Radio Serving Support Node) 107a to 107c.

Further, the mobile communication system 9 shown in FIG. 1 is connected through a gateway mobile-service switching center (GMSC; Gateway MSC) 108 and a gateway packet processor (GGSN: Gateway GSN) 109 to the public switched telephone network (PSTN) 104a and the internet 104b.

In this case, the public switched telephone network 104a is a telephone network for a portable telephone, for example. The public switched telephone network includes a fixed terminal 105 such as an ordinary subscriber's telephone as a connection destination. Further, the internet 104b includes a number of internet service providers (ISP, not shown). The gateway mobile-service switching center 108 is a gateway mobile-service switching center located at a position where connection to the PSTN 104a or an ISDN network (not shown) is achieved. Thus, the gateway mobile-service switching center 108 carries out switching service between the telephone network and the mobile communication network. Further, the gateway packet processor 109 is a gateway packet processor located at a position where connection to the ISP 104b is achieved. Thus, the gateway packet processor 109 carries out switching service on packets.

According to the IMT-2000 standard, connection service is achieved by using a specially arranged packet access procedure The subscriber can access the network with his or her personal computer (not shown) to achieve connection to a desired opponent party. In more concretely, a subscriber startups a browser software and designates the URL, for example. Automatically, the packet access procedure is started on the personal computer of the subscriber and then connection to the network is achieved. Consequently, the subscriber can achieve direct connection to the opponent party, similarly to the case where a personal computer is connected to a LAN (Local Area Network).

In other words, if the subscriber tries to connect to the network in a dial-up manner, the data generated from the subscriber is sent as a cell call through the switching centers 12a to 12c to the public switched telephone network 104a. According to the IMT-2000 standard, if the subscriber generates data in a packet form, the data is sent through the SGSNs 107a to 107c to the internet 104b (ISP). In the following description, the public switched telephone network 104a and the internet 104b are sometimes simply referred to as a network.

In this way, the cell call generated from the mobile communication system 9 is sent through the gateway mobile-service switching center 108 to the public switched telephone network 104a while the packet data generated from the mobile communication system 9 is sent through the gateway packet processor 109 to the internet 104b.

Further, the cell call generated from the fixed terminal 105 is sent through the public switched telephone network 104a and the gateway mobile-service switching center 108 to the mobile communication system 9. Date of e-mail or the like is sent through the internet 104b and the gateway packet processor 109 to the mobile communication system 9.

The mobile station 10 shown in FIG. 1 is a portable terminal capable of handling multicall communication mode. When the mobile station moves from one zone governed under any of the base stations 11a to 11c to another zone governed under any other base station of the same, the communication line is maintained by handover between the base stations. In this case, the communication line conceptually includes a telephone call, transmission and reception of FAX data, an internet communication by means of dial-up manner or the like. Further, the mobile station 10 sometimes referred to as a multicall terminal.

Figure 2:
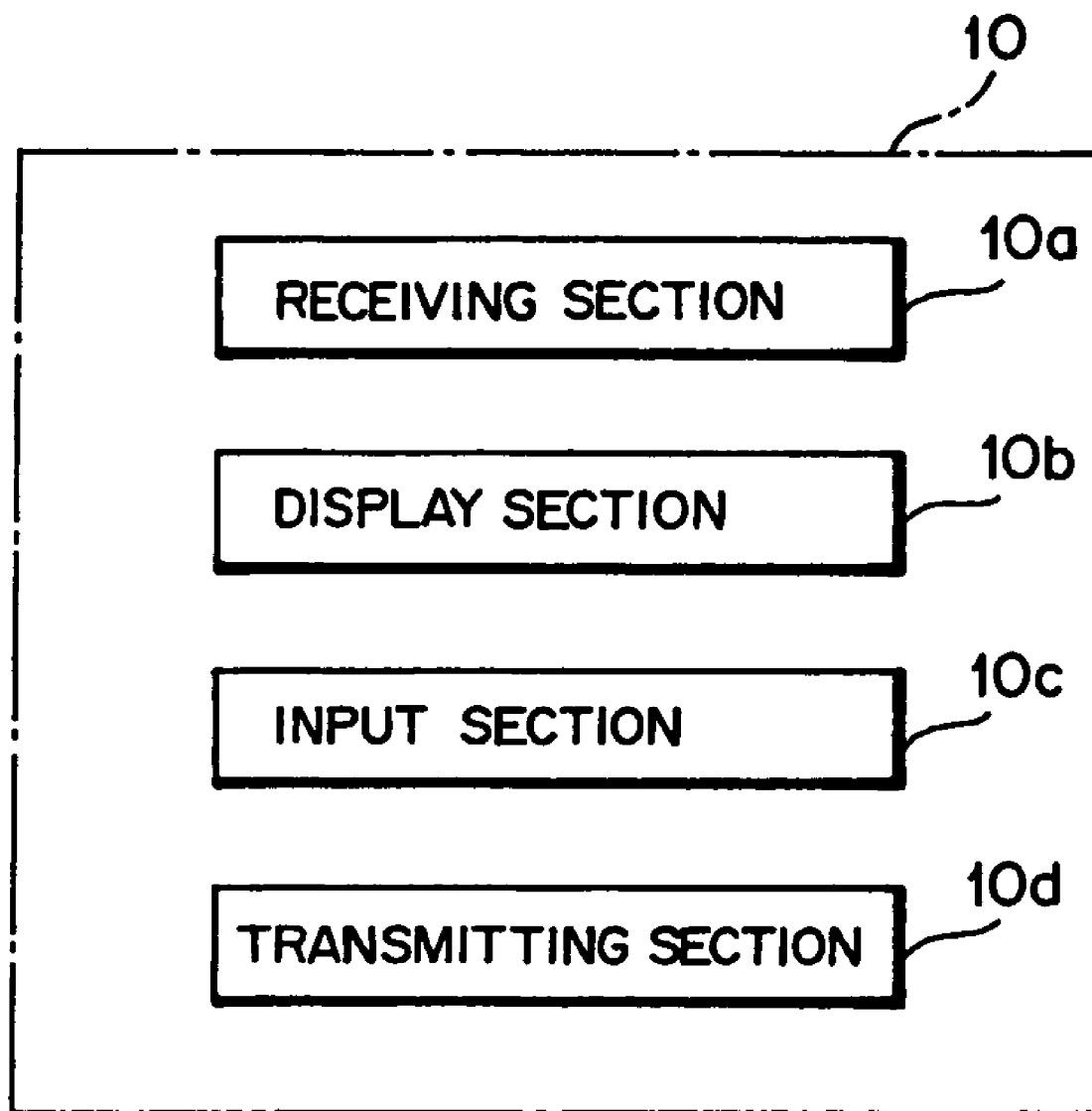
FIG. 2 is a diagram showing a function block of a mobile station according to the first embodiment of the present invention.

FIG. 2 is a diagram showing a function block of the mobile station according to a first embodiment of the present invention. The mobile station 10 shown in FIG. 2 is arranged to include receiving section 10a, display section (presenting section) 10b, input section 10c, and transmission section 10d.

In this case, the receiving section 10a is a function unit for receiving a special message regarding increases and decreases of a plurality of calls and extracting call-number change information or the like. This function can be realized by a receiving circuit (not shown), a CPU (Central Processing Unit), a RAM (Random Access Memory) and a software operated in a cooperative manner so that desired data is extracted from a signal decoded from the receiving circuit.

The special message (sometimes referred to as special signal message) is a message sent from the mobile-service switching center 12b or 12c to the mobile station 10. Before handover is effected on the mobile-service switching center 12b or 12c, the mobile-service switching center 12b or 12c inserts data indicative of the number of calls allowable to continue into the message and transmits the same to the mobile station 10.

The display section (presenting section) 10b is capable of displaying a plurality of calls under communication, which is identified by the call-number change information extracted by the receiving section 10a, to the user of the multicall communication mode supporting terminal in a visual manner or an audible manner in accordance with the call-number change information extracted by the receiving section 10a and presenting section 10b may be arranged to inform the user of the mobile station of the same information in an audible manner. The visual function can be implemented by a3 display device, for example, and the audible function can be implemented by a ringer, for example.

The input section 10c is provided so that the subscriber can designate a desired call to be continued from the plurality of calls displayed on the display section. The function of the input section 10c can be implemented by a ten-key device shown in FIG. 3, for example.

Figure 3:
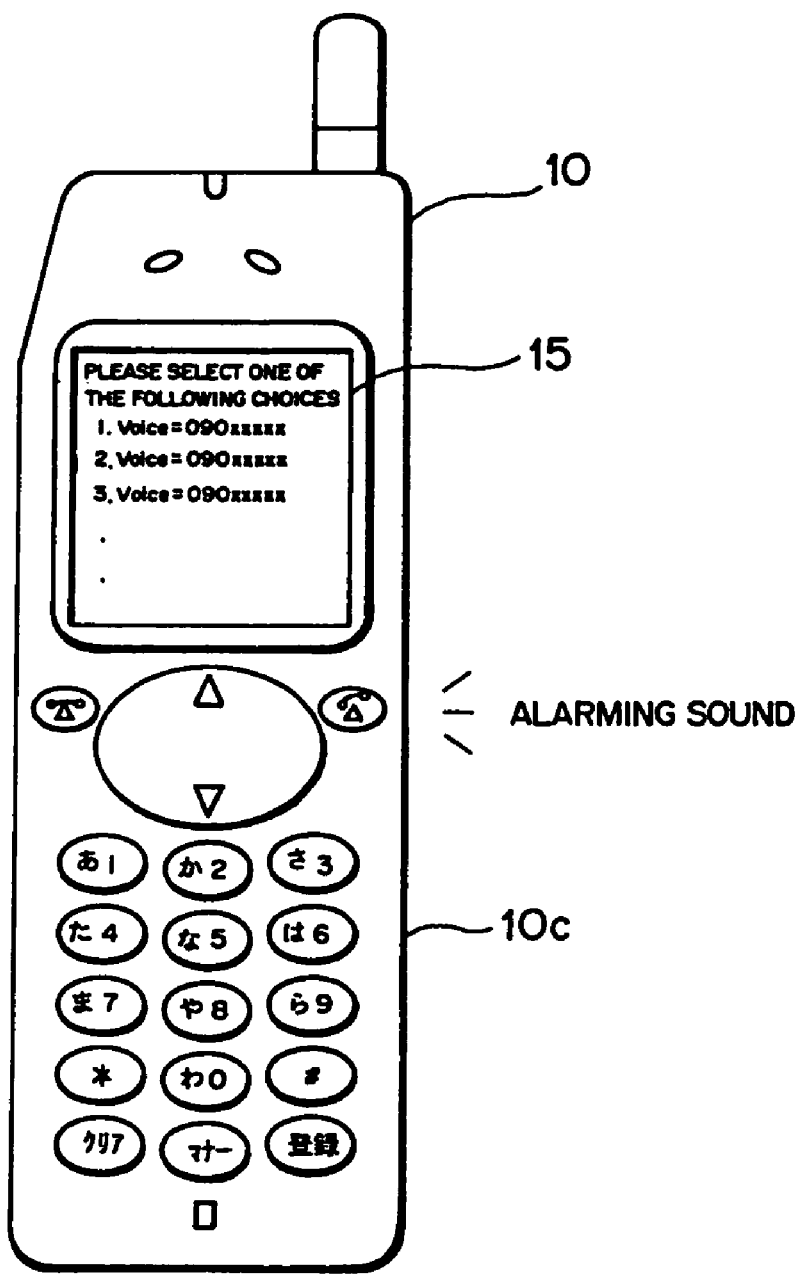
FIG. 3 is a diagram showing one example of a display screen of the mobile station according to the first embodiment of the present invention.

FIG. 3 is a diagram showing an example of display screen of the mobile station 10 according to the first embodiment of the present invention. A display device 15 shown in FIG. 3 displays the message sent from any of the base stations 11a to 11c. The subscriber can reply with a return message by depressing any of the ten-key. In this case, a short message service can be employed for achieving the display in the visual manner. Further, the mobile station 10 may be arranged such that if the mobile station 10 receives a message from the network side, the mobile station 10 emanates an alarming sound so that the sound property varies step by step. Thus, the subscriber or the user of the mobile station 10 is motivated to respond to the notification from the network side. Furthermore, the mobile station 10 shown in FIG. 3 has the same arrangement as that of the other embodiment and each modification thereof which will be described later on.

The transmitting section 10d (see FIG. 2) is arranged to transmit information regarding the desired call to continue which is selected by the input section 10c, to any of the base stations 11a to 11c. The function of the transmitting section 10d can be implemented by the CPU and the RAM and a transmitting circuit (not shown) for transmitting desired data.

In FIG. 1, each of the base stations 11a to 11c is arranged to transmit or receive a radio signal between the base station and the mobile station 10. Also, each of the base stations 11a to 11c is arranged to transmit or receive a signal of a predetermined format between the base stations and the any of the mobile-service switching centers 12a to 12c. Of these base stations 11a to 11c, the base station 11a is one that cannot support multicall communication mode. Conversely, the base stations 11b and 11c are ones that can support the multicall communication mode. Therefore, if a call from the mobile station 10 is connected to the base stations 11b and 11c, the mobile station 10 can enjoy communication based on the multicall communication mode. However, if a call from the mobile station 10 is connected to the base station 11a, the mobile station 10 can enjoy only communication based on single call communication mode.

These base stations 11a to 11c are arranged to include base station controllers 22a to 20c for controlling the base stations 11a to 11c.

Figure 4:
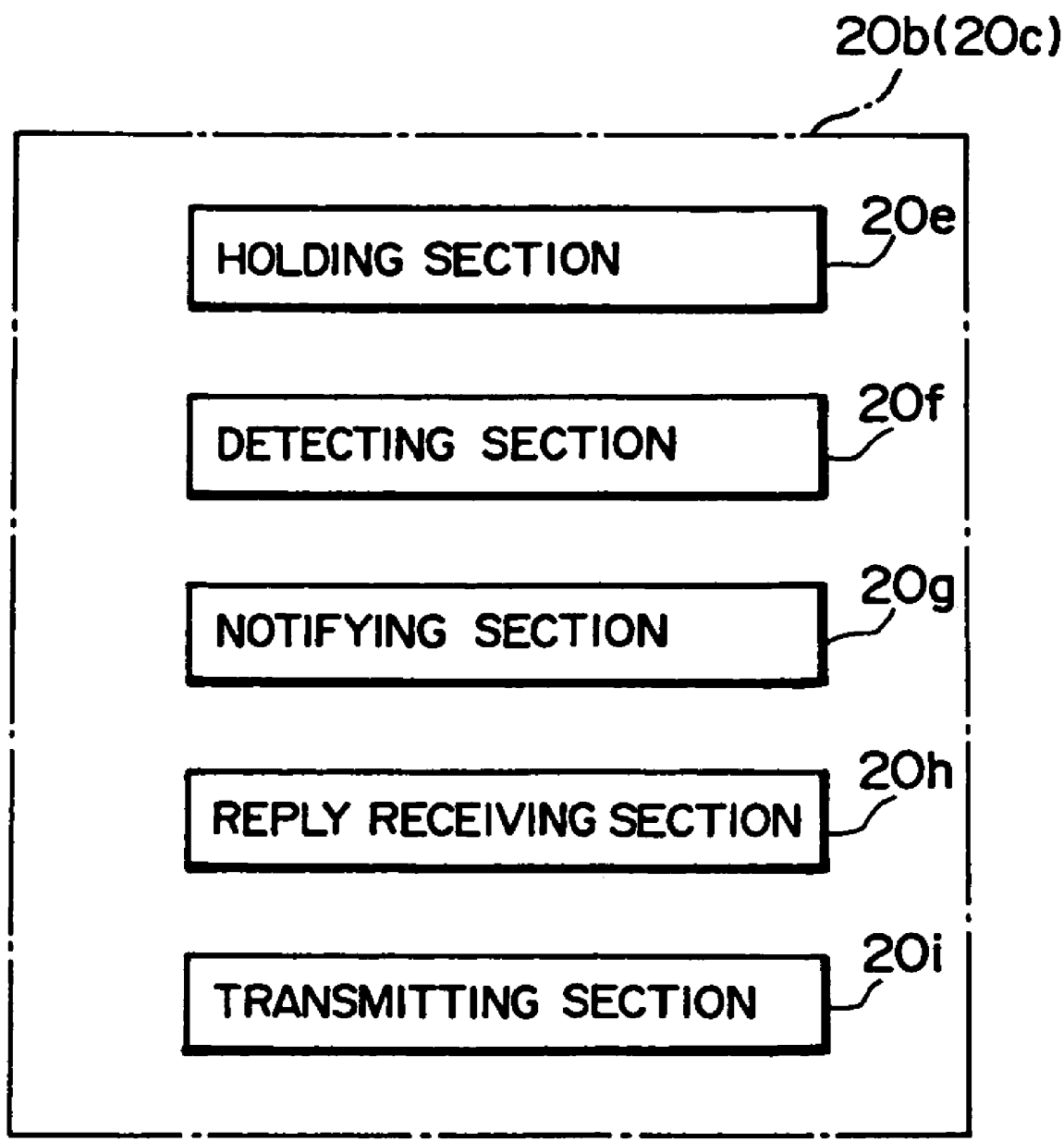
FIG. 4 is a diagram showing a function block of a base station controller according to the first embodiment of the present invention.

FIG. 4 is a diagram showing in a block form the function of the base station controller 20b (or 20c) according to the first embodiment of the present invention. The base station controller 20b shown in FIG. 4 is arranged to include holding section 20e, detecting section 20f, notifying section 20g, reply receiving section 20h, and transmitting section 20i.

In this case, the holding section 20e is a function unit for holding a priority of calls communicating with each of base stations located near the subject base station. The detecting section 20f is a function unit for detecting the occurrence of a handover and the congesting state of the network. The detecting section 20f detects a status that a handover is requested and determines a status that all of the calls held by the holding section 20e cannot be handled upon handover in the multicall communication mode based on the number of calls held by the holding section 20e. The notifying section 20g is a function unit for transmitting a special message regarding the number of calls allowable to continue to the multicall communication mode supporting terminal 10 (mobile station 10) which has generated a handover request detected by the detecting section 20f. The reply receiving section 20h is a function unit for receiving a reply designating a desired call to continue which the multicall mode supporting terminal 10 selects from the plurality of calls notified by the notifying section 20g. The transmitting section 20i is a function unit for transmitting data indicative of the desired call to continue which is designated by the message received by the reply receiving section 20h, to the mobile-service switching center 12b (or 12c). These functions can be implemented by a software. The base station controller 20c also has the same arrangement as that of the base station controller 20b. Also, a base station controller employed in other embodiments or modifications, which will be described later on, has the same arrangement.

Further, in FIG. 1, the mobile-service switching centers 12a to 12c can carry out switching service with other switching center, the PSTN, or the like. Of the mobile-service switching centers 12a to 12c, the mobile-service switching center 12a cannot support multicall communication mode. Conversely, the mobile-service switching centers 12b and 12c can support the multicall communication mode.

Figure 5:
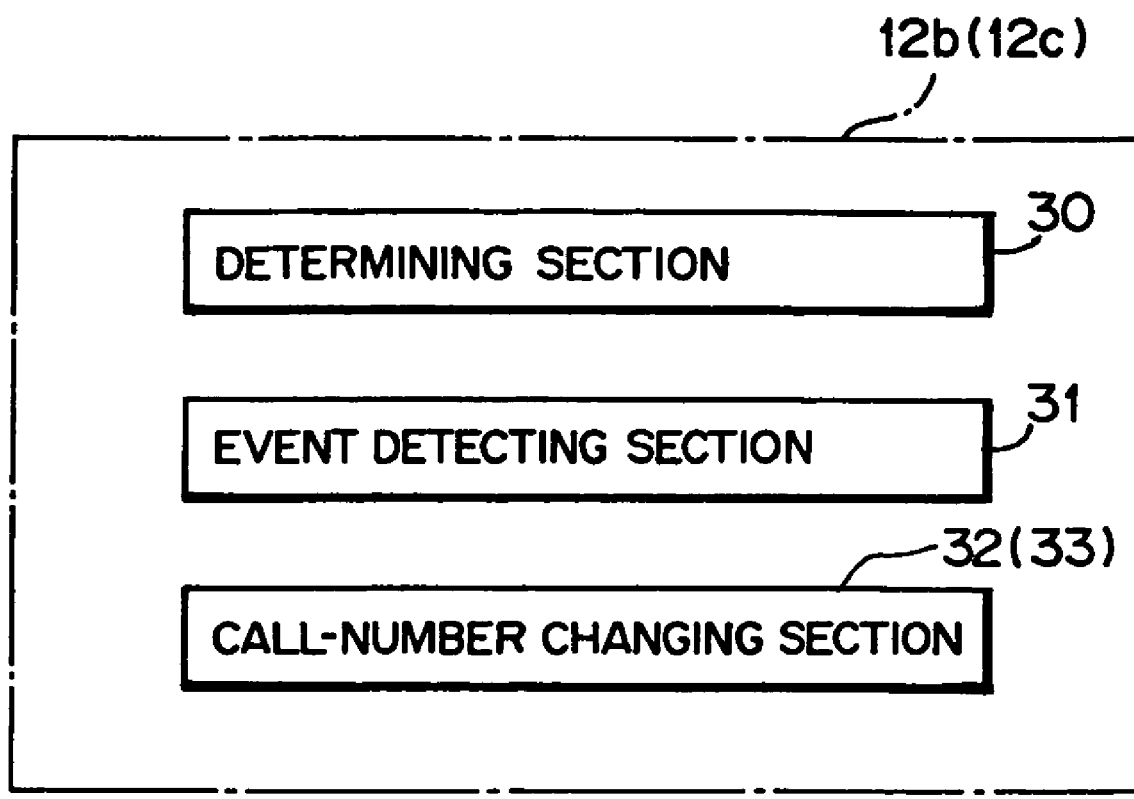
FIG. 5 is a diagram showing a function block of a mobile-service switching center according to the first embodiment of the present invention.

FIG. 5 is a diagram showing in a block form the function of the mobile-service switching center 12b according to the first embodiment of the present invention. The mobile-service switching center 12b shown in FIG. 5 is arranged to include determining section 30, event detecting section 31, and call-number changing section 32.

In this case, the determining section 30 is a function unit for determining whether an incoming call is a call from a first multicall communication mode supporting terminal which is capable of supporting a plurality of calls at a time or from a single-call mode supporting terminal which is capable of supporting only a single call at a time. That is, the determining section 30 can determine whether the mobile station 10 requesting a call supports the multicall communication mode or not.

Further, the event detecting section 31 is a function unit for detecting event caused by a handover occurrence or fluctuation of congesting state (the event is sometimes referred to as an environmental change). The detection thereof is made when the mobile-service switching center receives a handover requesting signal or when the CPU monitoring the congesting state of the network detects the increase of a load imposed on the CPU.

Further, the call-number changing section 32 is a function unit for changing the number of continuing calls of the multicall communication mode supporting terminal 10 which is determined by the determining section 30, when an event is detected by the event detecting section 31. The change of call-number in this case means that the number of continuing calls is increased or decreased.

In this way, it is determined whether the mobile station 10 on which a call is settled is a multicall communication mode supporting terminal or a single call communication mode supporting terminal. Then, the event detecting section 31 detects an event caused by the handover occurrence and fluctuation of congesting state of the network. Thereafter, the call-number changing section 32 changes the number of calls under communication when the event is detected during the communication by the mobile station 10.

The mobile-service switching center 12c also has the same arrangement as that of the mobile-service switching center 12b. The mobile-service switching center introduced in other embodiments or modifications, which will be described later, also has the same arrangement unless otherwise specified.

The call-number changing section 32 will be more fully described with reference to FIG. 6.

Figure 6:
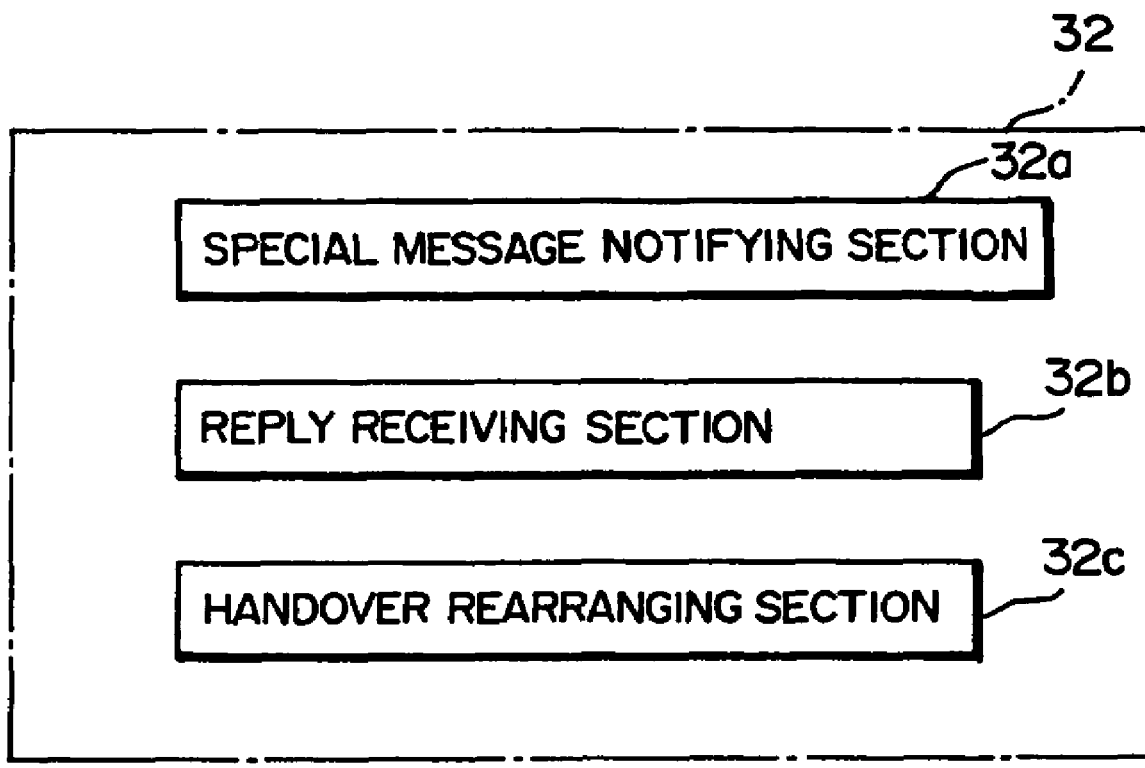
FIG. 6 is a diagram showing a function block of call-number changing section according to the first embodiment of the present invention.

FIG. 6 is a diagram showing in a block form the function of the call-number changing section 32 according to the first embodiment of the present invention. The call-number changing section 32 shown in FIG. 6 is arranged to include special message notifying section 32a, reply receiving section 32b and handover rearranging section 32c.

In this case, the special message notifying section 32a is a function unit for transmitting a special message having inserted therein the number of calls changing information regarding the increases and decreases of the plurality of calls, to the base station controllers 20b and 20c and the multicall communication mode supporting terminal 10. In more concretely, the mobile-service switching centers 12b and 12c create the special message in such a manner that an existing single call processing message is edited or novel special message is created. The special message notifying section 32a is arranged to make the first multicall communication mode supporting terminal 10 emanate an alarming sound changing step by step so as to correspond to the status taken by the call-number changing information.

The reply receiving section 32b is a function unit for receiving a reply containing data regarding a desired call to continue which is selected by the multicall communication mode supporting terminal 10 from the plurality of calls which are notified for the multicall communication mode supporting terminal 10 for selection by the special message notifying section 32a. The handover rearranging section 32c is a function unit for rearranging the handover process in such a manner that the desired call to continue which is designated in the reply received by the reply receiving section 32b is maintained and an undesired call which is not selected by the first multicall mode supporting terminal is disconnected. The function of each section can be implemented by software.

In FIG. 1, the VLRs 106a to 106c are provided so as to correspond to the switching centers 12a to 12c, respectively. The VLRs 106a to 106c are function units for temporarily storing therein data of subscribers supplied from the HLR 13. Even if a user of the mobile station 10 moves with the mobile station 10 within an area of the switching centers 12a to 12c, the VLRs 106a to 106c can continuously provide connection service to the user of the mobile station 10 without accessing the HLR 13. The arrangement of the VLRs 106a to 106c will be described in more detail in the description on the first modification of a fourth embodiment of the present invention.

The HLR 13 is a function block connected to the VLRs 106a to 106c or the like and carrying out management on mainly subscriber's data of the mobile station 10.

Furthermore, the packet processors 107a to 107c are units for processing packets. In actual practice, the packet processors 107a to 107c are arranged to function in a cooperative manner with the switching centers 12a to 12c so as to carry out packet processing as a unit of MSC-SGSN. When multicall communication mode is taken place, messages are transmitted and received in an interactive manner between the MSC and the SGSN so as to exchange information.

The arrangement of the mobile communication system 9 shown in FIG. 1 is also applicable to other embodiments or modifications thereof which will be described later on.

In this way, if the multicall communication mode is taken place in the system shown in FIG. 1, a radio signal containing a voice signal generated at the mobile station 10 is received by the base station 11c, for example, and transmitted through the mobile-service switching center 12c to the public switched telephone network 104a. Thus, interactive communication is established between the mobile station 10 and the fixed terminal 105 as an opponent party. When communication is effected with packet data, interactive communication is established in the similar manner. That is, text data of an e-mail generated from the mobile station 10, for example, is transmitted through the base station 11c, the mobile-service switching center 12c and the internet 104b to another mail server (not shown).

As described above, the mobile communication system 9 allows a single multicall communication mode supporting terminal to settle a plurality of communication lines at a time. Further, the mobile communication system 9 supports functions of multicall communication mode in which a plurality of calls are connected at a time and multiconnection communication mode in which a plurality of communication links are settled by a single call. Accordingly, a subscriber of the network can transmit and receive text data while communicating with a telephone or transmitting FAX data. Furthermore, the mobile communication system 9 supports the multicall communication mode and the single call communication mode.

As described above, if the subscriber has a communication under the multicall mode (or the multisession mode) and then the subscriber is obliged to go to the single communication mode or decrease the number of calls to continue to a call-number smaller than currently maintained call-number due to an environmental change during the communication, then desired call selected by the subscriber can be continued.

In this case, the environmental change means that in the mobile communication system, for example, a handover is requested owing to the movement of the mobile station from one zone to another zone, or alternatively, the congesting state is fluctuated, with the result that the subscriber is obliged to go to the single communication mode or decrease the number of calls to continue to a call-number smaller than currently maintained call-number.

If the environmental change is brought about, the following three steps of processing are carried out in the mobile communication system 9.

(1-1) If the environmental change is detected by the mobile-service switching center 12b or 12c, it is examined whether the calls can be continued while maintaining the current communication status of the network or not.

(1-2) If it is determined that the calls cannot be continued while maintaining the current communication status of the network, then the mobile-service switching center 12b or 12c creates a new message having the present invention applied thereto before executing handover. Then, the mobile-service switching center 12b or 12c transmits the message to the subscriber together with the data indicative of number of calls allowable to continue.

(1-3) Both of the mobile-service switching centers 12b and 12c change the number of calls to continue in accordance with the reply from the subscriber upon carrying out handover processing or the like so as to respond to the request deriving from the environmental change.

Figure 7:
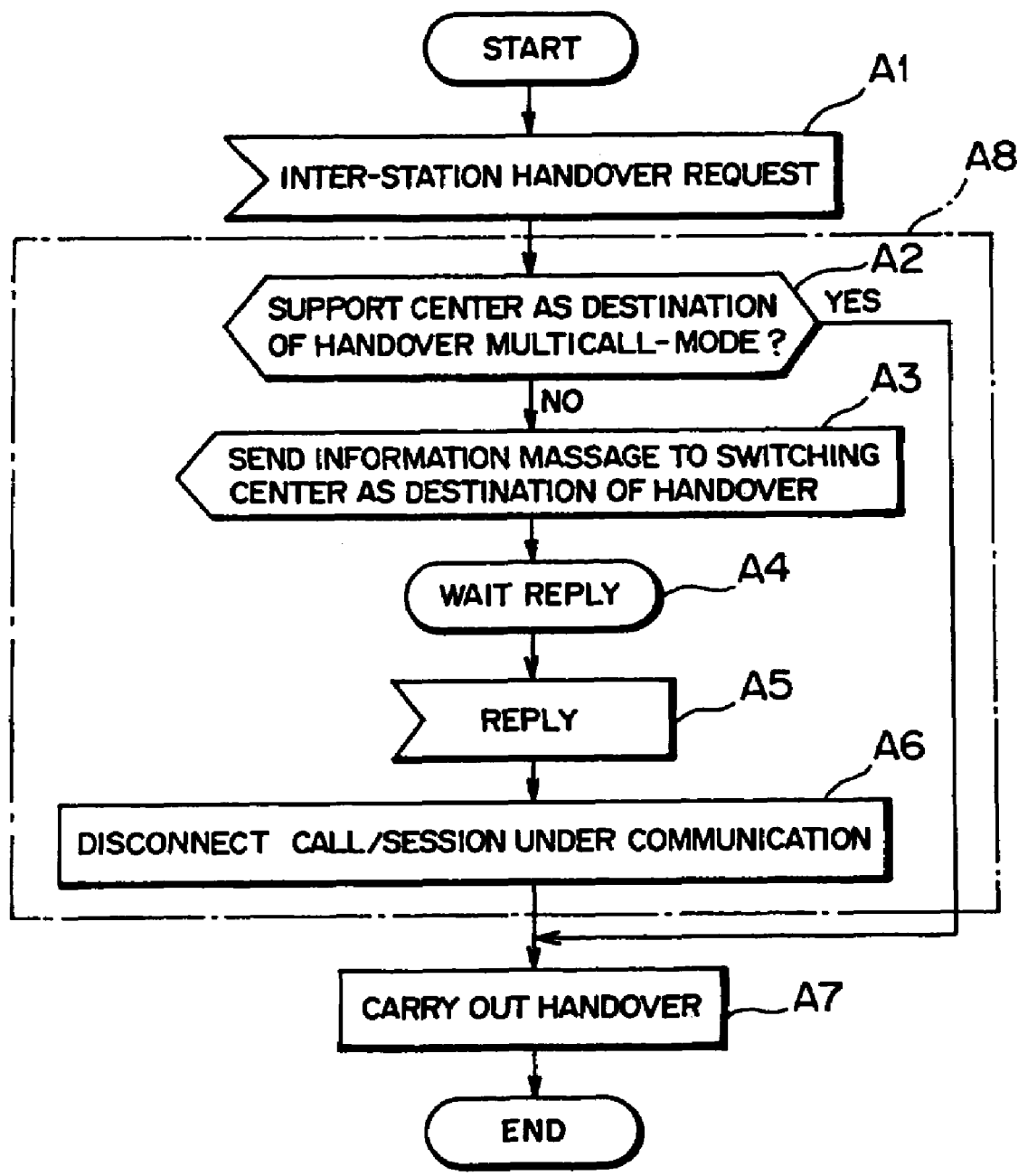
FIG. 7 is a flowchart of the mobile-service switching center according to the first embodiment of the present invention.
Figure 8:
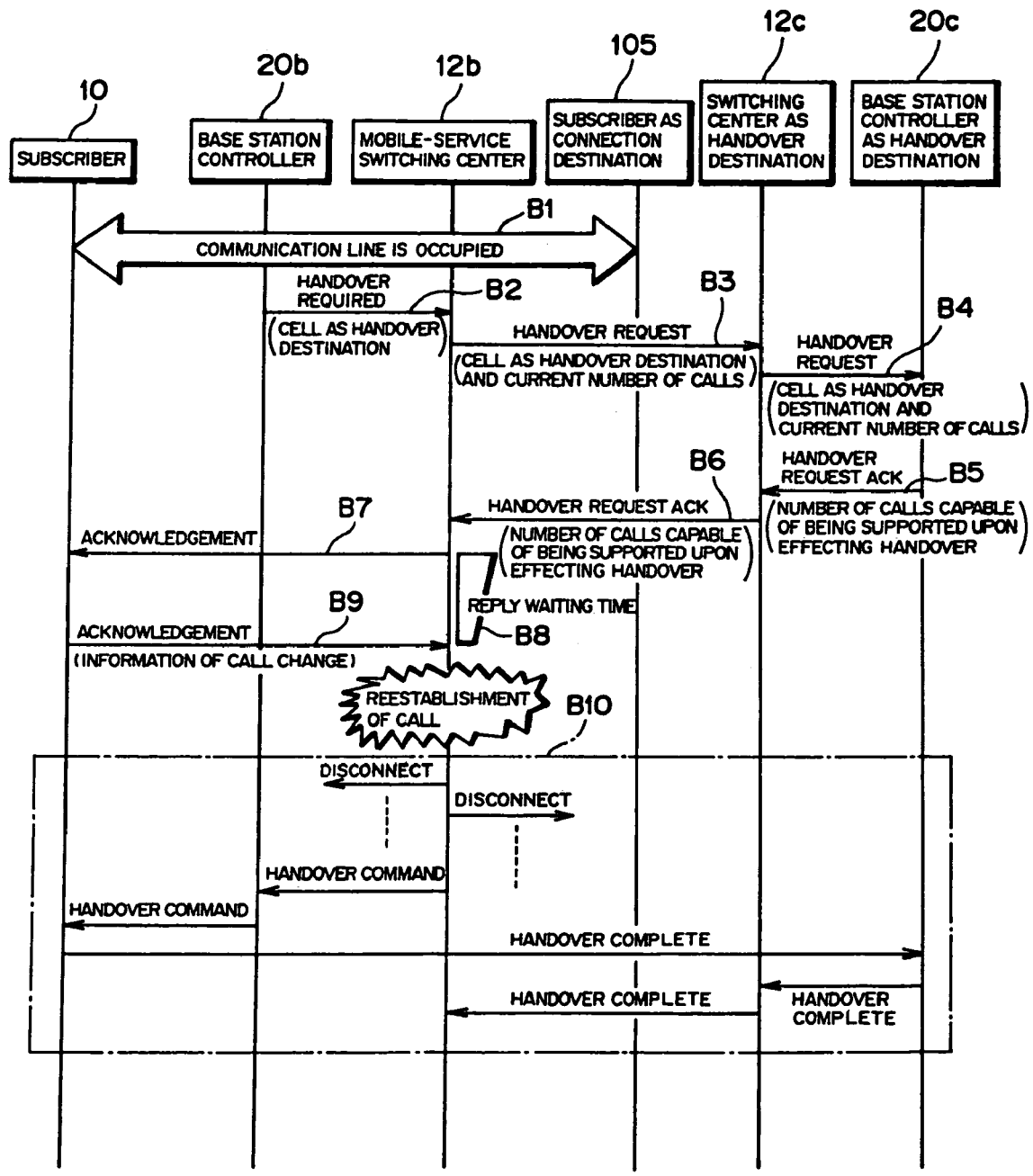
FIG. 8 is a diagram showing a signaling sequence of handover according to the first embodiment of the present invention.

Operation of the above-described switching center system of the embodiment will hereinafter be described in detail with reference to a flowchart of FIG. 7 and FIG. 8 illustrating an example of signaling sequence. FIG. 7 is a flowchart showing a processing carried out by the mobile-service switching center 12b of the first embodiment of the present invention. When the mobile-service switching center 12b receives a request of handover between switching center (step A1), then the mobile-service switching center 12b determines whether or not the mobile-service switching center 12c (switching center to be connected as a destination of the handover), which is designated by the data contained in the handover request, supports the multicall communication mode. At step A2, it is determined that the mobile-service switching center (support center) 12c supports the multicall communication mode, then YES route is taken. Then, the process of handover is executed at step A7.

On the other hand, at step A2, if it is determined that the switching center to be connected as a destination of the handover does not support the multicall communication mode such as the switching center 12a, then NO route is taken. Then, at step A3, the mobile-service switching center 12b informs the mobile station 10 that the destination of the handover does not support the multicall communication mode. Further, the mobile-service switching center 12b awaits a reply from the mobile station 10 (step A4). If the mobile-service switching center 12b receives the reply from the mobile station 10 (step A5), the mobile-service switching center 12b disconnects the call or session under communication (step A6) and executes the process of handover (step A7). Thus, the processing of FIG. 7 is completed. In the flowchart of FIG. 7, portions surrounded by a square attached with reference A8 represents a processing of multicall communication mode.

FIG. 8 is a diagram illustrative of a signaling sequence of handover according to the first embodiment of the present invention. As shown in the figure, processing contents (B1, B2, B3) and names of messages (B2 to B7 and B9) are included in the sequence. A processing scheme for handling the occurrence of handover will be described with reference to FIG. 8. In the following description, the name of message is sometimes denoted by abbreviation. Also, the name of message is sometimes denoted by abbreviation in other embodiments or modifications.

Initially, if any call of request is made based on the single call communication mode, the subscriber will have the corresponding communication service without any specific operation. However, if a subscriber operating the mobile station 10 is busy in communication with another subscriber of the connection destination (fixed terminal 105) based on the multicall communication mode (the step is attached with reference B1), and the base station controller 20b transmits Handover Required Message B2 indicating that handover is requested, to the mobile-service switching center 12b, then the mobile-service switching center 12b detects fluctuation of environmental change upon receiving Handover Required Message B2 (event detecting step). Thereafter, the mobile-service switching center 12b examines whether the calls under communication can be continued upon handover. The process of examination includes confirmation of the capacity of the network as the destination of handover (i.e., multicall communication mode is supported or not) and the congesting state of the network as the destination of handover.

When the mobile-service switching center 12b detects any event at the step of detecting an event, the mobile-service switching center 12b transmits Handover Request Message as a special message having inserted therein call-number changing information regarding increases and decreases of the plurality of calls, to the switching center 12c as the handover destination (special message notifying step). The message B3 is made to have the number of calls currently under communication inserted therein and sent to the switching center 12c as the handover destination.

The switching center 12c transmits Handover Request Message B4 to the base station controller 20c as the handover destination.

Each of the switching center 12c as the handover destination receiving Message B3 and the base station controller 20c as the handover destination receiving Message B4 determines its own capacity and state of congestion. Further, the switching center 12c and the base station controller 20c return Handover Request Ack Message B5 and Handover Request Ack Message B6 each containing data of number of calls allowable to continue upon handover, respectively.

When the mobile-service switching center 12b receives Handover Request Ack Message B6, the mobile-service switching center 12b confirms the number of allowable call to continue upon handover. If it is determined that all of the call are not allowable to continue upon handover, prior to the execution of handover, the mobile-service switching center 12b edits Special Message B7 for notification and transmits the same to the mobile station 10 so that the mobile station 10 is informed of the number of calls allowable to continue and made to emanate a gentle alarming sound. Further, the mobile-service switching center 12b triggers a reply waiting timer B8. To edit the special message and transmit the same is done in accordance with the following steps (2-1) to (2-3).

(2-1) The mobile-service switching center 12b transmits Handover Instruction Message B7 during the handover to the multicall communication mode supporting terminal (mobile station 10) so that data of alarming message capable of being displayed on the display device of the mobile station is included in the message.

(2-2) The mobile-service switching center 12b edits a special message for notification and transmits the same to the mobile station 10. The method thereof may be same as that of transmitting an existing single call processing message or a new special message.

(2-3) The mobile-service switching center 12b edits a short message and transmits the same to the mobile station 10.

At this time, the subscriber listens to the alarming sound and confirms the display, and then selects a call identifier corresponding to a desired call to continue (see FIG. 3). Thus, the subscriber responds to the request with Reply Message B9. In this way, the mobile-service switching center 12b can receive a reply containing data indicative of a desired call to continue selected by the subscriber with the multicall communication mode supporting terminal 10 from the plurality of calls which are presented in the above-described special message notifying step (reply receiving step). Further, if the mobile-service switching center 12b can receive Reply Message B9 before the timer counts the reply waiting time, calls other than the selected call are forcibly disconnected and handover is executed. Thus, connection reestablishment is achieved. (step B10). That is, the mobile-service switching center 12b provides connection service for the desired call to continue which is designated by the message received at the reply receiving step while disconnects undesired calls to continue which are not selected from the plurality of calls by the subscriber with the multicall communication mode supporting terminal 10 (handover rearranging step).

If the time period of Reply Waiting Timer B8 is expired while no reply is received, the mobile-service switching center 12b again edits the special message for notification containing data making the mobile station emanate the alarming sound and transmits the message to the mobile station. Further, the mobile-service switching center 12b-again effects the reply waiting timer. At this time, the data of the alarming sound is made different from that of the prior step so as to indicate that if the mobile station 10 does not transmit a reply message, the continuing calls are to be disconnected.

Furthermore, if the reply waiting timer is effected N times (N is a natural number of two or more) and no reply is received by the mobile-service switching center 12b, the mobile-service switching center 12b selects at random allowable number of calls to continue upon handover or halts the handover operation.

As described above, if the mobile-service switching center 12b detects an event caused by an occurrence of handover and a fluctuation in congesting state of a network (event detecting step), the mobile-service switching center 12b transmits Special Message B3 having inserted therein call-number changing information regarding the increases and decreases of the number to the switching center as a connection destination connected by the handover when the event is detected at the event detecting step (special message notifying step). Further, the mobile-service switching center 12b transmits Special Message B7 to the mobile station 10 so as to inform of the number of calls allowable to continue. Thereafter, the mobile-service switching center 12b receives the reply regarding a desired call to continue selected by the subscriber with the mobile station 10 from the plurality of calls notified by the special message created at the special message notifying step (reply receiving step). The mobile-service switching center 12b rearranges the handover in such a manner that the desired call to continue designated by the reply received at the reply received step is maintained in connection and an undesired call to continue which is not selected from the plurality of calls by the subscriber with the mobile station 10 (handover rearranging step).

Accordingly, if the subscriber is placed in a multisession technology environment in which the subscriber makes a telephone call while connects his or her data terminal equipment to the internet, and environmental change causes a need for change into a single call communication mode or for decreasing the number of calls smaller than the current number of continuing calls, then the subscriber is allowed to select a desired call to continue from the plurality of calls settled in the communication mode.

As described above, if the subscriber enjoys the telephone call and connection to the internet at a time, and handover request is brought about or the congesting state of the network is fluctuated, with the result that only a single call or a number of calls smaller than the current maintained calls are allowable to continue, the subscriber can select a desired call to continue.

Furthermore, since the subscriber can take an initiative in selecting a call to continue and hence a plurality of calls can be managed based on priority for selecting a call settled by each subscriber, the communication network can provide more advanced connection service based on the multicall communication mode.

(A1) Description of a First Modification of the First Embodiment of the Present Invention The following is a description on the first modification when the network congesting state is fluctuated. Also in the present modification, the mobile communication system has the same arrangement as that of the mobile communication system 9 shown in FIG. 1. Therefore, the arrangement of the mobile communication system will not described.

Figure 9A:
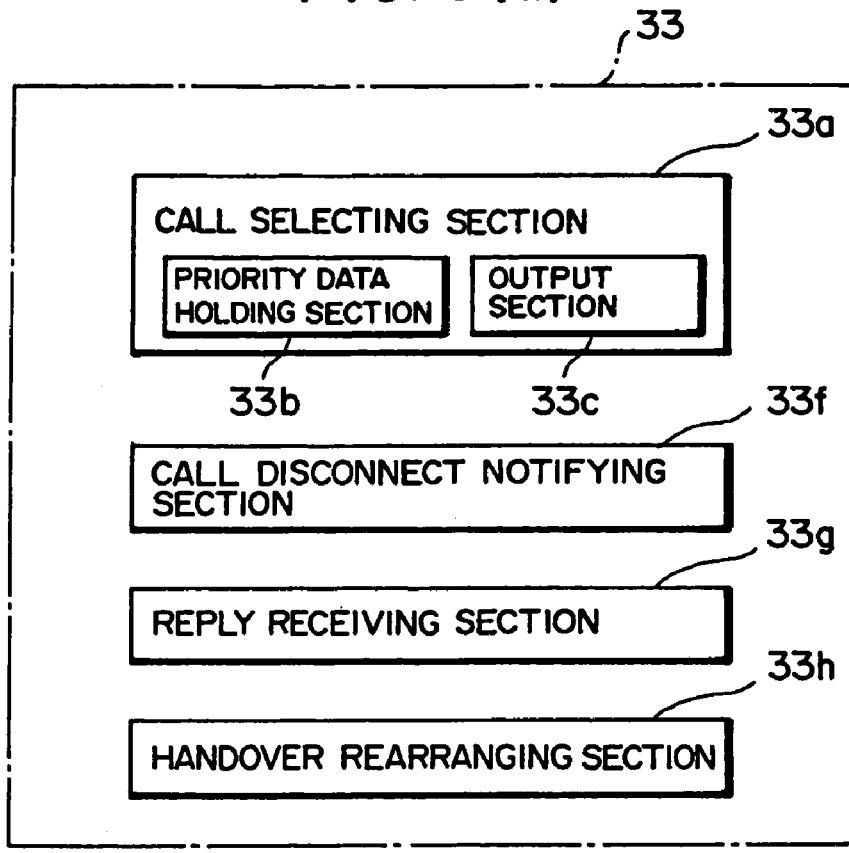
FIG. 9($a$) is a diagram showing a function block of call-number changing section according to a first modification of the first embodiment of the present invention.

FIG. 9(a) is a diagram showing in a block form the function of the call-number changing section according to the first modification of the first embodiment of the present invention. The call-number changing section 33 shown in FIG. 9(a) is a function unit for changing the number of calls to continue on the multicall communication mode supporting terminal 10 which is determined as a multicall communication mode supporting terminal by the determining section 30 (see FIG. 5) when the event detecting section 31 (see FIG. 5) detects an event during the telephone call on the multicall communication mode supporting terminal 10. The call-number changing section 33 is arranged to include call selecting section 33a, call disconnect notifying section 33f, response receiving section 33g and handover rearranging section 33h.

In this case, the call selecting section 33a is a function unit for selecting a call to be disconnected from the plurality of call under communication based on a predetermined condition. Thus, the call selecting section 33a is arranged to include priority holding section 33b and output section 33c. The priority holding section 33b is a function unit for giving priority data to the calls under communication and holding the priority data. The output section 33c is a function unit for outputting data designating the call to be disconnected based on the priority data held the priority holding section 33b when connection service restriction deriving from the event is relaxed. These functions can be implemented by a CPU, RAM and so on, for example.

The call disconnect notifying section 33*f* is a function unit for transmitting disconnect message to a multicall communication mode supporting terminal 10 corresponding to the disconnected call selected by the call selecting section 33*a*. The condition based on which the selecting operation is carried out will be described later on. Further, the reply receiving section 33*g* is a function unit for receiving a reply regarding the desired call to continue selected by the multicall communication mode supporting terminal 10 which received the disconnect message from the call disconnect notifying section 33*f*. The handover rearranging section 33*h* is a function unit for maintaining connection corresponding to the desired call to continue which is designated by reply received by the reply receiving section 33*g*. The handover rearranging section 33*h* also disconnect an undesired call to continue selected from the plurality of calls by the multicall communication mode supporting terminal 10.

As described above, if the communication network supports a multicall communication mode, a single subscriber occupies a plurality of communication lines. If the plurality of calls continued by the single subscriber are not given priority data and there is no call having relatively low priority which can be substituted with a new call request, the number of calls occupying a plurality of communication lines in the network can be decreased to provide a vacant line in the network to accommodate the new call request made by a new subscriber.

Accordingly, when the congesting state of the network is fluctuated and the mobile-service switching center 12*b* receives a new call request, even if there is no call having priority relatively low with respect to the priority of the new call request, the mobile-service switching center 12*b* need not refuse the new call request and can accommodate the same.

The switching center system employed in the present modification arranged as described above will hereinafter be described with reference to flowcharts of FIGS. 10 and 11 and illustration of signaling sequence in FIG. 12. Initially, processing carried out in the mobile-service switching center 12*b* upon single call communication mode and multicall communication mode will be described with reference to flowcharts of FIGS. 10 and 11.

Figure 10:
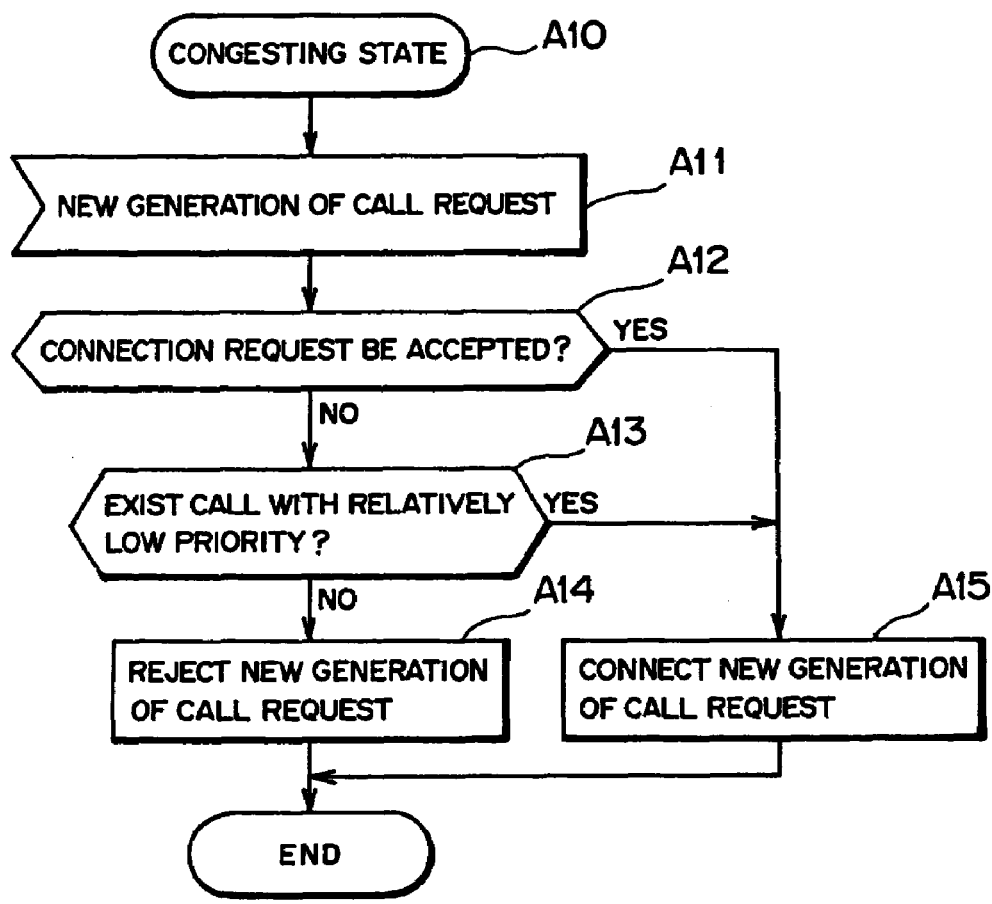
FIG. 10 is a flowchart showing a processing carried out by the mobile-service switching center when a single call mode communication is effected.

FIG. 10 is a flowchart illustrative of a processing carried out in the mobile-service switching center 12*b* upon the single call communication mode. When the network suffers from congesting state (step A10), if the mobile-service switching center 12*b* receives a new call request (step A11), the mobile-service switching center 12*b* determines whether the new call request can be accepted in connection or not at step A12. If it is determined that the new call request can be accepted in connection, then YES route is taken and the processing proceeds to step A15, where the new call is connected to the network and the processing is completed.

On the other hand, at step A12, if the mobile-service switching center 12*b* determines that the new call request cannot be accepted in connection, then NO route is taken. Then, the mobile-service switching center 12*b* examines whether there is any call having low priority at step A13. If it is determined that there is a call having low priority, YES route is taken and the mobile-service switching center 12*b* carries out processing after step A15. If it is determined that there is no call having low priority at step A13, NO route is taken. At step A14, the new call request is refused and the processing is completed.

Figure 11:
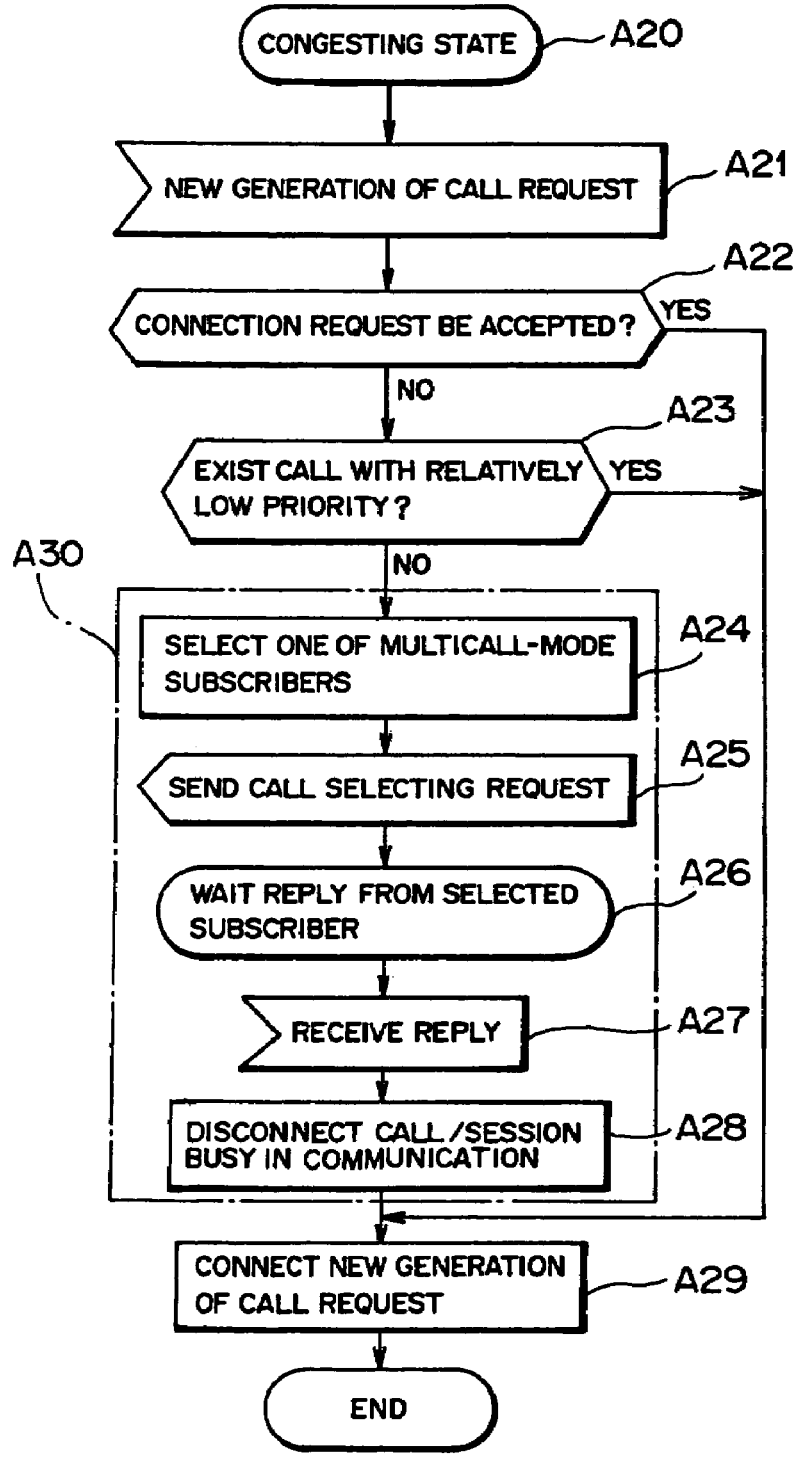
FIG. 11 is a flowchart showing a mobile-service switching center according to the first modification of the first embodiment of the present invention.

FIG. 11 is a flowchart showing a processing carried out in the mobile-service switching center 12*b* (denoted as Switching Center) according to the first modification of the first embodiment of the resent invention. Initially, when the network is brought into a congesting state (step A20) and the mobile-service switching center 12*b* receives a new call request (step A21), the mobile-service switching center 12*b* determines whether or not the new call request can be accepted in connection at step A22. If it is determined that the new call request can be accepted in connection, YES route is taken. At step A29, the new call is connected to the network and the processing is completed.

On the other hand, if the mobile-service switching center 12*b* determines that the new call request cannot be accepted in connection at step A22, NO route is taken. Then, the mobile-service switching center 12*b* examines whether there is any call having low priority at step A23. If it is determined that there is a call having low priority, YES route is taken and the mobile-service switching center 12*b* carries out processing of step A29. If it is determined that there is no call having low priority at step A23, NO route is taken. Then, the processing proceeds to step A24.

The mobile-service switching center 12*b* selects one station from a number of mobile stations 10 of subscribers in the multicall communication mode (step A24), and transmits a message of call selecting request to the selected mobile station (step A25). Further, the mobile-service switching center 12*b* awaits a reply from the mobile station 10 (step A26). When the mobile-service switching center 12*b* receives the reply (step A27), the mobile-service switching center 12*b* disconnects the call/session under communication (step A28), connects the new call (step A29) and then the processing is completed. Thus, a new call request made based on the single call communication mode can positively be accommodated in the network. In the flowchart shown in FIG. 11, a portion surrounded by a square attached with reference A30 is a processing about multicall communication mode.

Figure 12:
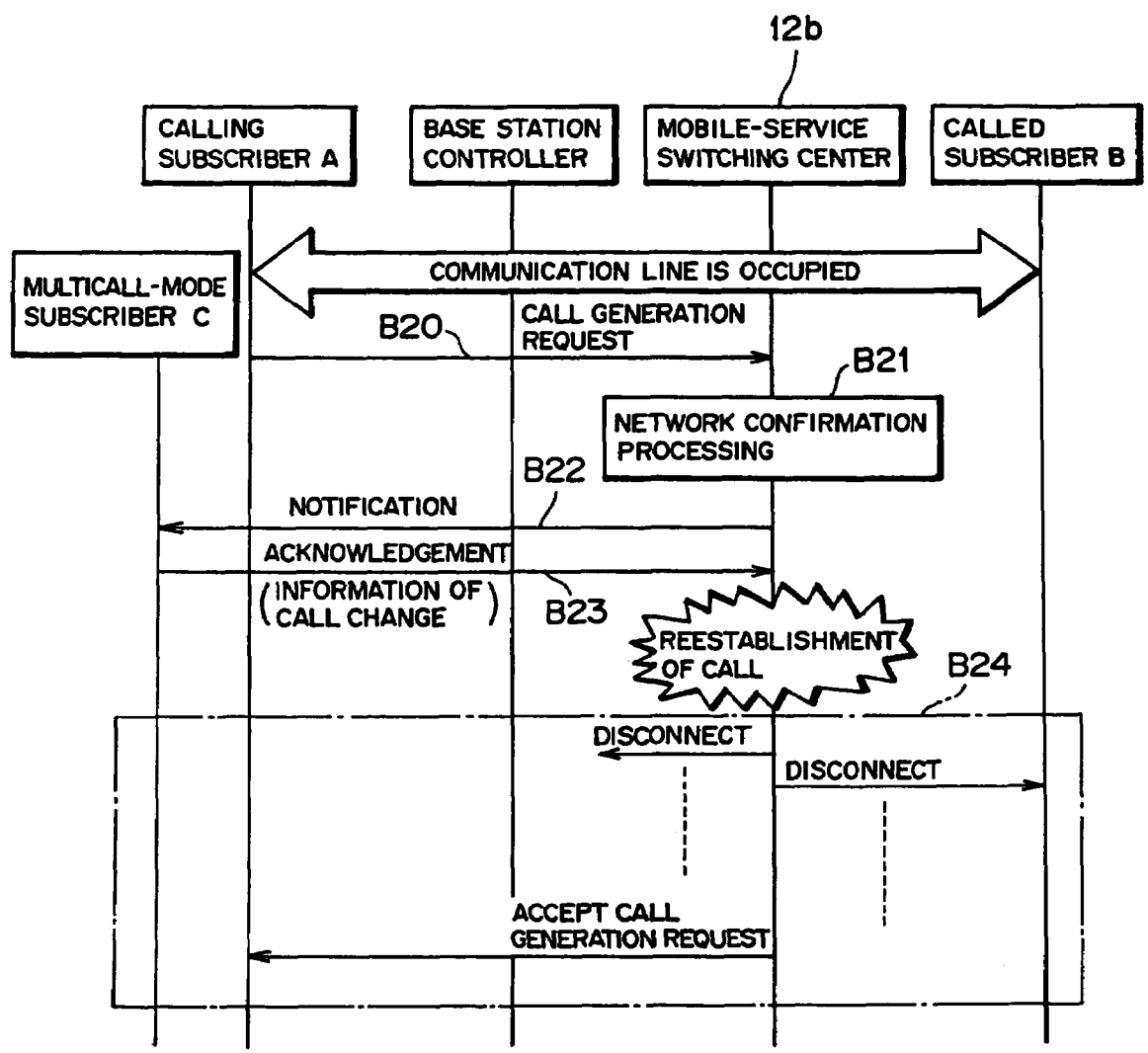
FIG. 12 is a diagram showing a signaling sequence of handover according to the first modification of the first embodiment of the present invention.

FIG. 12 is a diagram illustrative f a signaling sequence of handover according to the first modification of the first embodiment of the present invention. As shown in FIG. 12, the signaling sequence includes notations of processing contents (B21, B24) and name of messages (B20, B22, B23).

Initially, the subscriber need not carry out any special operation or the like upon generating or receiving an existing call. When the mobile-service switching center 12*b* receives Call Generation Request Message B20, the mobile-service switching center 12*b* detects an event deriving from the occurrence of handover or fluctuation of congesting state of network (event detecting step), and carries out network confirmation processing B21. That is, if the mobile-service switching center 12*b* finds a subscriber (denoted as multicall-mode subscriber C) who is generating a new call request when the mobile-service switching center 12*b* cannot provide satisfactory connection service, the mobile-service switching center 12*b* edits Special Message B22 for requesting decrease of number of calls and transmits the same to the multicall-mode subscriber C (special message notifying step). An existing call processing message of new special message is utilized as Special Message (Notification) B22.

On the other hand, the subscriber having the multicall communication mode supporting terminal is informed of the reception of the message through the alarming sound or the display screen. The subscriber C selects a desired call to continue by designating the corresponding call identifier and responds to the mobile-service switching center 12*b* with Reply Message (Acknowledgement) B23. Thus, the mobile-service switching center 12b receives Reply Message (Acknowledgement) B23 regarding the desired call to continue selected from the plurality of calls presented by Special Message B22 by the subscriber C with the multicall communication mode supporting terminal (reply receiving step).

Thereafter, the processing goes to step B24 which is denoted by a frame of one-dot chain line. That is, the mobile-service switching center 12b provides connection service on the desired call to continue which is designated by the message received at reply receiving step, to the subscriber C. At the same time, the mobile-service switching center 12b disconnects an undesired call to continue which is not selected from the plurality of calls by the subscriber C with the multicall communication mode supporting terminal (handover rearranging step). Further, the mobile-service switching center 12b processes the new call request by using the vacant communication line.

As described above, at special message notifying step, when the mobile-service switching center 12b receives a call request sent from the subscriber C (second multicall communication mode supporting terminal) other than the calling subscriber A (first multicall communication mode supporting terminal), then the mobile-service switching center 12b inserts call-number decreasing information for decreasing the number of calls into the Special Message B22. Further, at handover rearranging step, the mobile-service switching center 12b transmits a reply regarding the call request by using the communication line which becomes vacant by disconnecting the undesired call to continue designated at the special message notifying step.

As described above, when the mobile-service switching center 12b suffers from the congesting state of the network and there is no call having priority relatively low with respect to the priority of the new call request, the mobile-service switching center 12b can provide connection service by assigning the vacant communication line to the subscriber who generates a new call request. Thus, the network can provide more improved quality of service to subscribers.

As described above, similarly to the first embodiment of the present invention, when a subscriber makes communication in the multicall communication mode and handover request is brought about or the congesting state of the network is fluctuated, with the result that only a single call or a number of calls smaller than the current maintained calls are allowable to continue, it becomes possible to continue the desired call designated by the subscriber.

(B) Description of a Second Embodiment of the Present Invention

According to the arrangement of the second embodiment of the present invention, when the mobile-service switching center 12b (or 12c) receives a handover request of the mobile station 10, the mobile-service switching center 12b notifies the handover request to the destination of the handover by using the reply receiving section 20h and the transmitting section 20i (se FIG. 4) provided in each of the base station controllers 20b and 20c. Further, the overall arrangement of the mobile communication system has the same arrangement as that of the mobile communication system 9 shown in FIG. 1. Therefore, the arrangement of the mobile communication system will not be described.

The second embodiment of the present invention will hereinafter be described with an example in which handover of the communication traffic including the mobile station 10 is effected from the base station controller 20b to the base station controller 20c. In more concretely, there is provided a method of changing the number of calls based on a multicall communication mode in which the mobile-service switching center 12b transmits information regarding the base station controller 20b as a connection destination to be connected by the handover to the base station controller 20c upon transmitting a special message (base station controller notifying step), the mobile-service switching center 12b receives call-number changing information regarding the number of calls allowable to continue, the call-number changing information is transmitted from the base station controller 20c as a connection destination notified at the base station controller notifying step (call-number changing information receiving step), and the call-number changing information, which is received at the call-number changing information receiving step, is transmitted to the multicall communication mode supporting terminal 10.

According to the above method of providing communication service, the subscriber can enjoy a telephone call and connection to the internet at a time. Thus, the subscriber can enjoy communication by means of a voice signal, a packet and in a multicall communication mode or multisession communication mode. Moreover, when the subscriber is placed in a mobile communication, and environmental change is brought about such as when handover request is brought about or the congesting state of the network is fluctuated, with the result that only a single call or a number of calls smaller than the current maintained calls are allowable to continue, the call desired by the subscriber can be continued.

Figure 13:
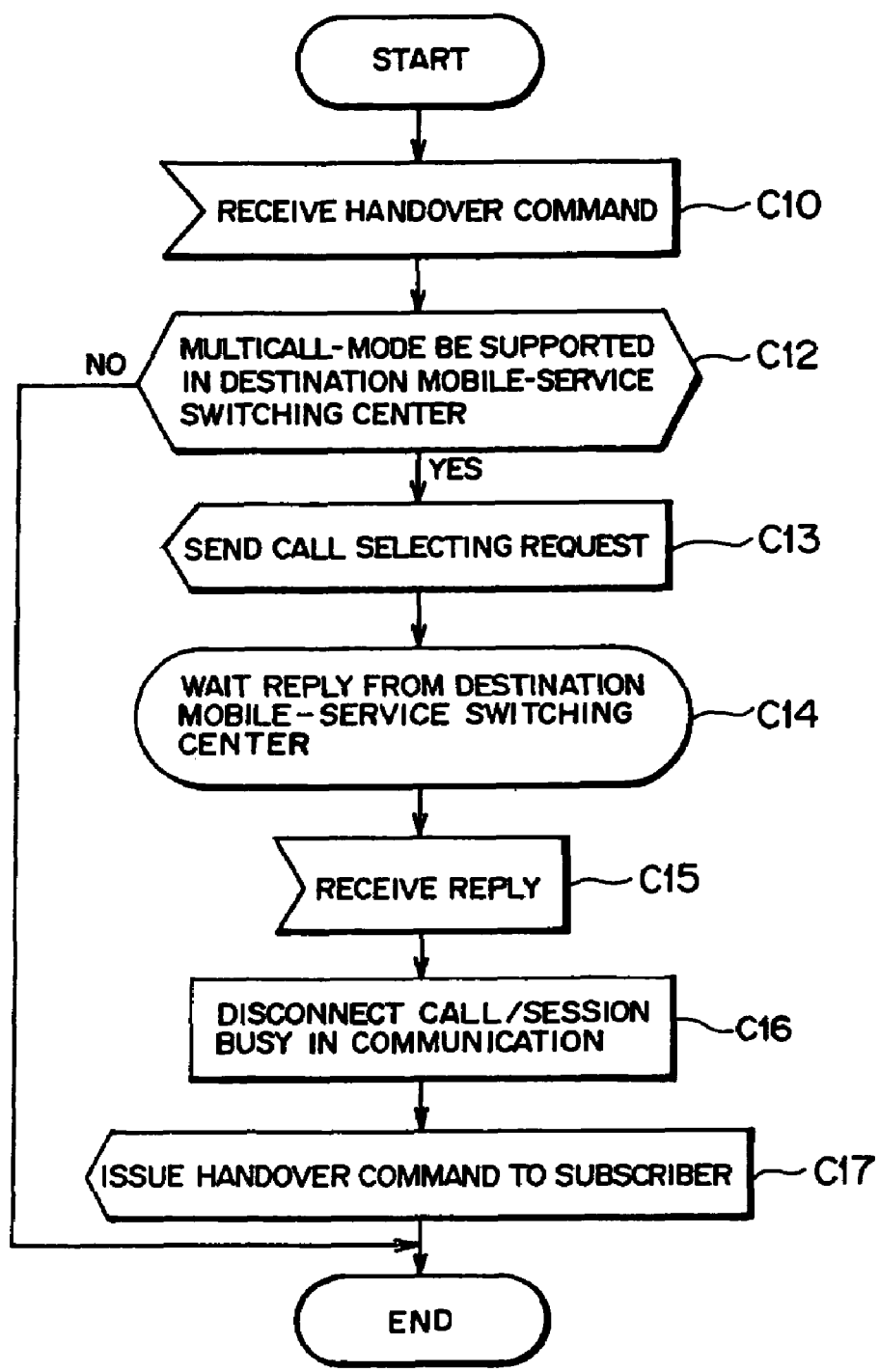
FIG. 13 is a flowchart illustrative of a processing carried out by a base station controller of a handover source according to a second embodiment of the present invention.

FIG. 13 is a flowchart illustrative of a processing carried out in the base station controller 20b as a source of handover according to the second embodiment of the present invention. When the base station controller 20b receives a handover command message (step C10), then the base station controller 20b examines whether or not the call request can be supported on the basis of multicall communication mode at step C12. If it is determined that the call request can be supported on the basis of the multicall communication mode, YES route is taken. At step C13, the base station controller 20b transmits Handover Required Message to the base station controller 20c as the destination of the handover. Then, the base station controller 20b is placed in a waiting mode for waiting a reply from the base station controller 20c (step C14).

At this time, when the base station controller 20b receives the reply (step C15), the base station controller 20b disconnects a call/session under communication (step C16) and transmits a handover command to the subscriber (step C17). Thus, the processing is completed.

At step C12, if it is determined that the call request cannot be supported on the basis of the multicall communication mode, NO route is taken and the base station controller 20b terminates the processing.

Figure 14:
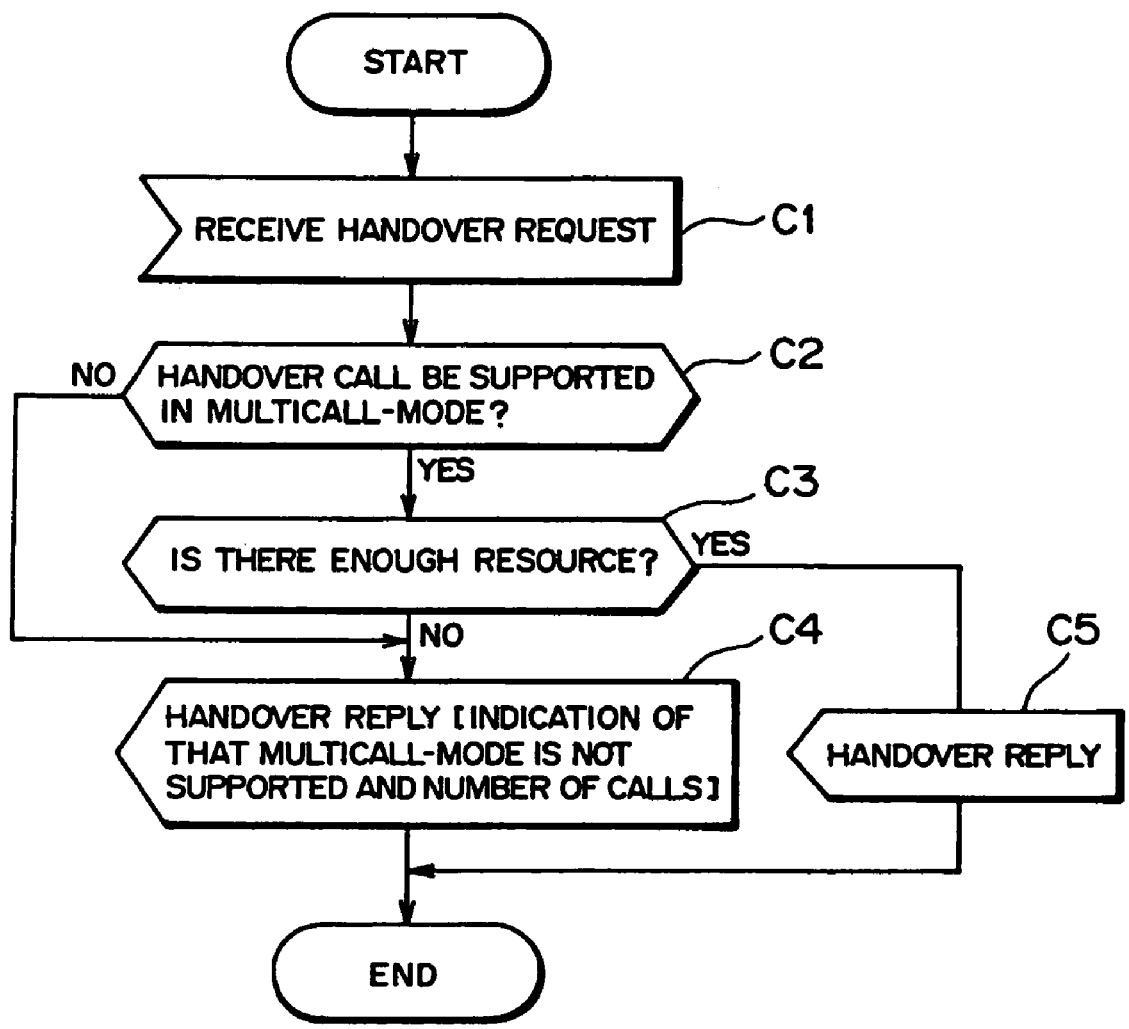
FIG. 14 is a flowchart illustrative of a processing carried out by a base station controller of a handover destination according to the second embodiment of the present invention.

FIG. 14 is a flowchart illustrative of a processing carried out in the base station controller 20c as the handover destination according to the second embodiment of the present invention. In more concretely, the flowchart illustrates handover confirmation processing effected when the base station controller 20c receives a handover command message from the base station controller 20b as the handover source. At step C1 shown in FIG. 14, when the base station controller 20c receives a handover request message (Handover Request) from the mobile-service switching center 12c, the base station controller 20c examines whether or not the call request can be supported on the basis of the multicall communication mode at step C2. If it is determined that the call request can be supported on the basis of the multicall communication mode, YES route is taken. At step C3, it is examined whether or not the handover can be executed while the multicall communication mode is maintained, based on the resource such as the state of congestion or the capacity of the base station.

If it is determined that there is enough resource to carry out handover, then YES route is taken and the base station controller 20c transmits Handover Request Ack Message (Handover Reply) to the mobile-service switching center 12c (step C5). Thus, the processing is completed. Conversely, if it is determined that there is no allowance in resource to carry out handover at step C3, then NO route is taken and the base station controller 20c transmits a handover reply message containing data indicating that the handover cannot be executed while the multicall communication mode is maintained, to the mobile-service switching center 12c (step C4). Thus, the processing is completed.

At step C2, if it is determined that the call request cannot be supported on the basis of the multicall communication mode, NO route is taken, and the base station controller 20c carries out the processing of step C4.

Figure 15:
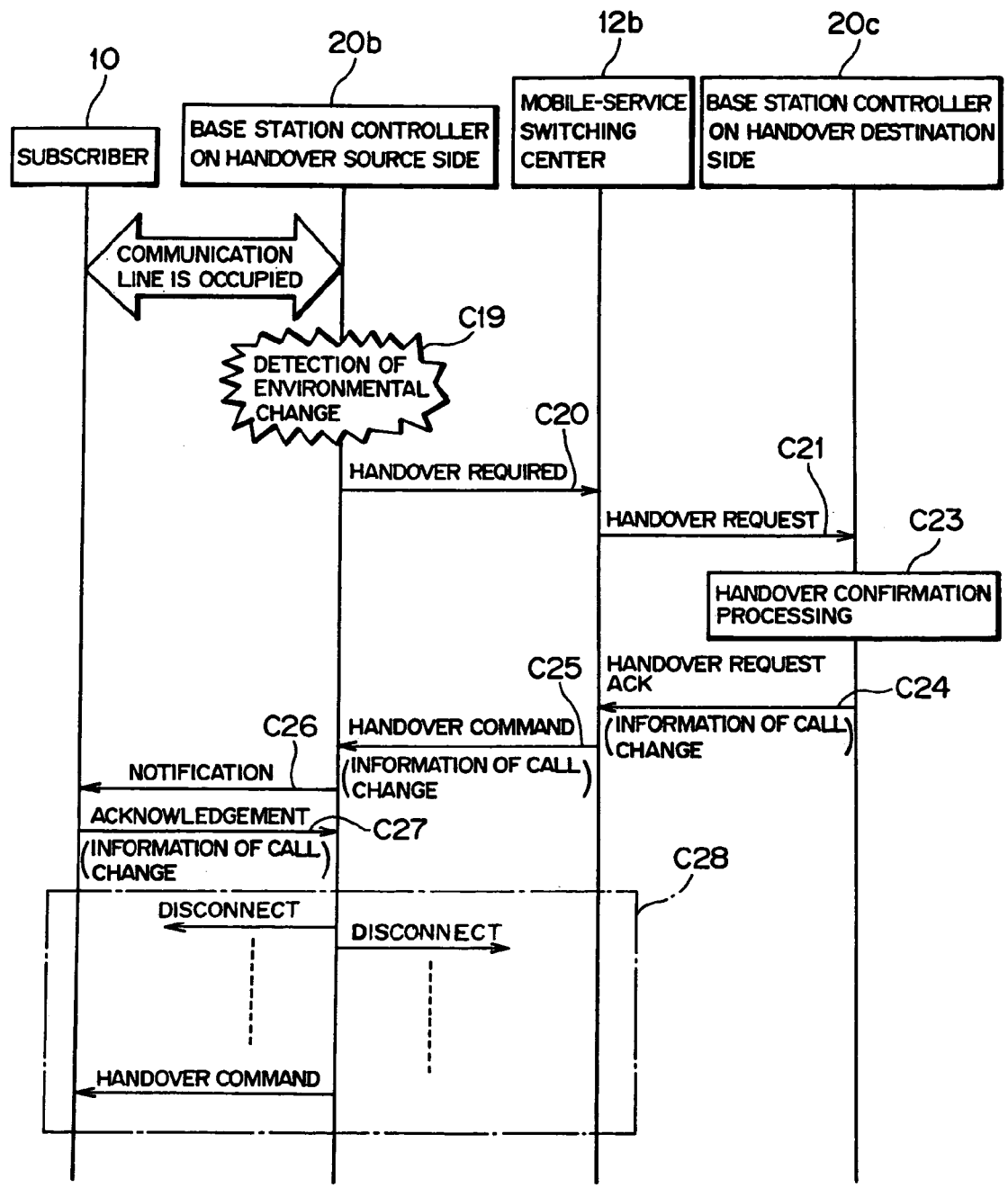
FIG. 15 is a diagram showing a signaling sequence of handover according to the second embodiment of the present invention.

An operation of switching center system upon handover according to the present embodiment arranged as described will hereinafter be described in detail with reference to a signaling sequence of FIG. 15. FIG. 15 is a diagram illustrative of a signaling sequence of the embodiment according to the present invention. As shown in FIG. 15, the signaling sequence contains event occurrence and contents of processing (C19, C23 and C28) and name of messages (C20, C21, C24 to C27).

As shown in step C19 in the figure, when the base station controller 20b detects handover necessity due to environmental change, the base station controller 20b transmits Handover Required Message C20 to the mobile-service switching center 12b. The mobile-service switching center 12b transmits Handover Request Message C21 to the base station controller 20c as a candidate of handover destination.

The base station controller 20c receives Handover Request Message C21 and carries out handover confirmation processing (attached with reference C23). The base station controller 20c can be informed that the handover request is one based on the multicall communication mode. At this time, depending on the congesting state of the network or the capacity of the base station, the base station controller 20c can deliver a determination that the handover cannot be executed while maintaining the multicall communication mode. Thus, the base station controller 20c returns Handover Request Ack Message C24 containing data indicating that the handover cannot be executed while maintaining the multicall communication mode, to the mobile-service switching center 12b.

Handover Request Ack Message C24 is sent to the mobile-service switching center 12b. Then the message is formed into Handover Command Message C25 in the mobile-service switching center 12b and this message is sent to the base station controller 20b. The base station controller 20b extracts the data indicating that the handover cannot be executed while maintaining the multicall communication mode from Handover Command Message C25. Thus, the base station controller 20b transmits Special Message C26 (Notification) containing data indicative of a number of calls allowable to continue, to the mobile terminal 10 of the subscriber. This processing includes the following three steps, for example.

(3-1) The base station controller 20b transmits a handover command message containing alarming message which can be displayed on the display screen of the multicall communication mode supporting terminal 10 under handover.

(3-2) The base station controller 20b transmits a special message for notification. The way to transmit the message may be the same as that of a single call processing message or new special message.

(3-3) The base station controller 20b edits a short message and transmits the same. At this time, a subscriber, who receives the messages with his or her mobile station and informed of the messages by means of the display screen of the station, selects a call identifier corresponding to a desired call to continue (see FIG. 3) and responds to the base station 20b with Reply Message (Acknowledgement) C27.

When the base station controller 20b receives Reply Message C27, the base station controller 20b forcibly disconnects calls other than the selected call. Then, handover is carried out and call is reestablished (see portion of the signaling sequence attached with reference C28).

As described above, when a subscriber makes communication in the multicall communication mode and handover request is brought about or the congesting state of the network is fluctuated, with the result that only a single call or a number of calls smaller than the current maintained calls are allowable to continue, it becomes possible to continue the desired call designated by the subscriber.

Furthermore, since the subscriber can take an initiative in selecting a call to continue and hence a plurality of calls can be managed based on priority for selecting a call settled by each subscriber, the communication network can provide more advanced connection service based on the multicall communication mode.

(C) Description of Third Embodiment of the Present Invention

The present embodiment relates to a mode in which a handover request is brought about. In the present embodiment, the base station controller 20b is assumed to have a capacity for serving as a base station itself, in addition to information regarding neighboring base stations in case of handover. The information regarding the neighboring base stations includes information about the base station 11c provided near the base station controller 20b, the capacity of the base station 11c and so on. The overall arrangement of the mobile communication system is substantially the same as that of the mobile communication system 9 shown in FIG. 1. Therefore, the overall arrangement of the mobile communication system of the present embodiment will not be described.

Figure 16:
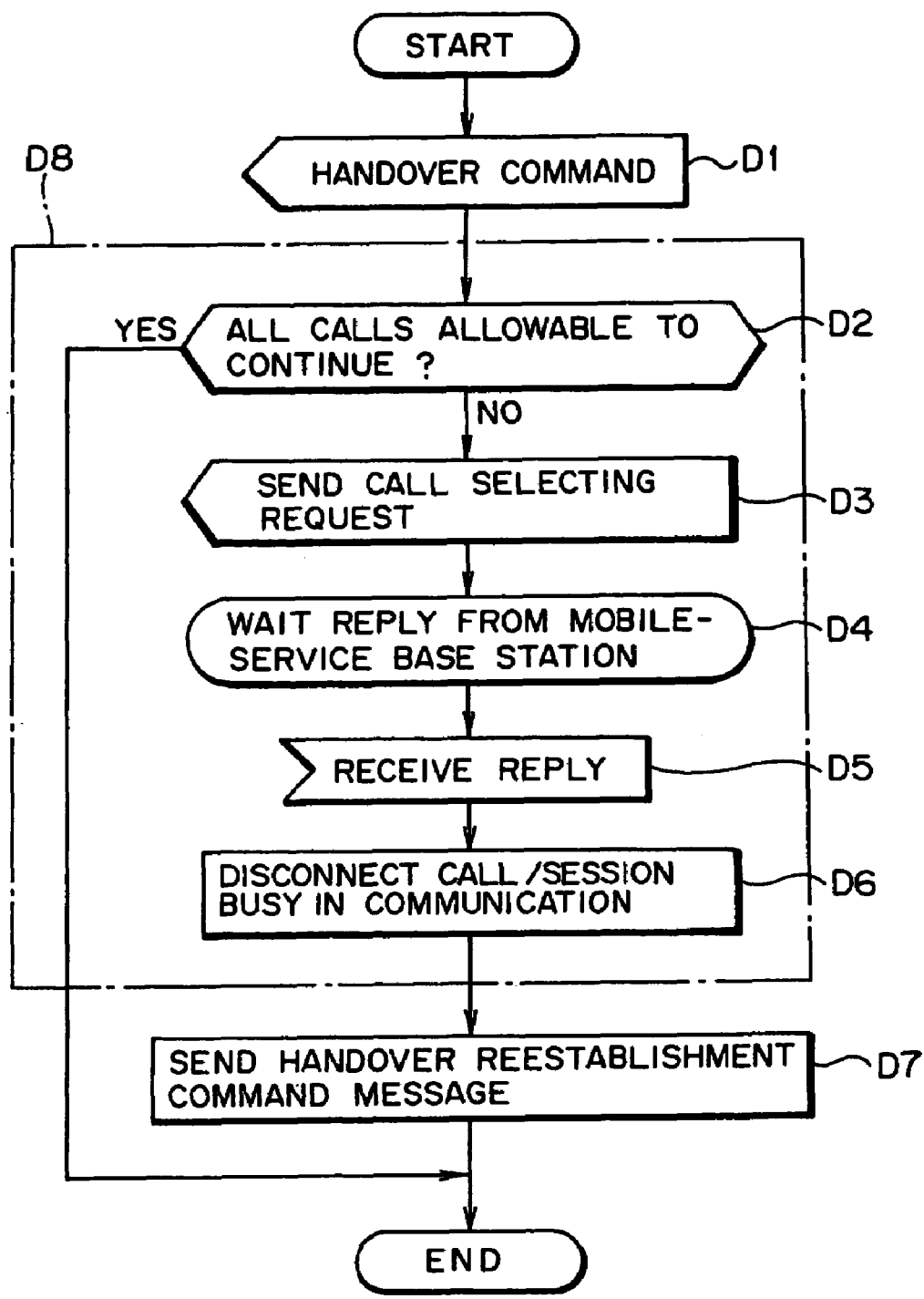
FIG. 16 is a flowchart showing the mobile-service switching center according to a third embodiment of the present invention.

FIG. 16 is a flowchart showing processing of the mobile-service switching center 12b (denoted as Switching Center) according to a third embodiment of the present invention. The mobile-service switching center 12b transmits Handover Command Message (at step D1), and examines whether all of the calls are allowable to continue or not at step D2. If it is determined that all of the calls are allowable to continue, then YES route is taken and the processing is completed. Conversely, if it is determined that all of the calls are not allowable to continue, NO route is taken. Then, the mobile-service switching center 12b transmits a message of call selecting request at step D3. Subsequently, the mobile-service switching center 12b awaits the reply thereof (step D4). When the mobile-service switching center 12b receives the reply thereof (step D5), the mobile-service switching center 12b disconnects the call/session under communication (step D6). Thereafter, the mobile-service switching center 12b transmits a message of handover rearranging command (handover reestablishment command) to the base station controller 20b as a handover source (step D7). Thus, the processing is completed. The portion surrounded by a square attached with reference D8 is a processing portion relating to call connection.

Figure 17:
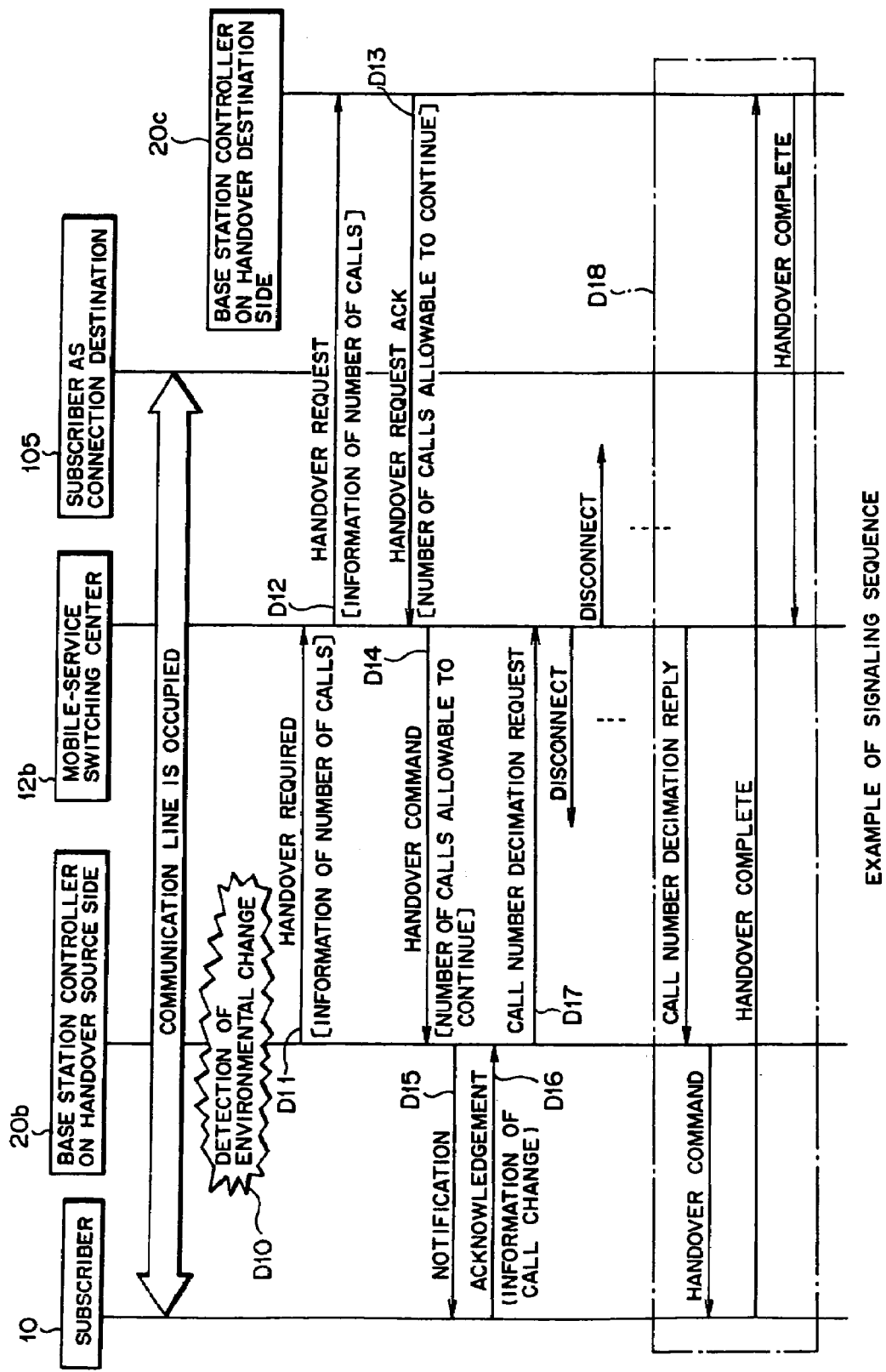
FIG. 17 is a diagram showing a signaling sequence of handover according to the third embodiment of the present invention.

Operation of the switching center system of the present embodiment arranged as described above will be more fully explained with reference to FIG. 17. FIG. 17 is a diagram showing a signaling sequence carried out upon handover according to the third embodiment of the present invention.

Initially, when the base station controller 20b as the handover source detects an environmental change requesting handover, for example (step D10), the base station controller 20b transmits Handover Required message D11 containing data indicative of current communication status, to the mobile-service switching center 12b. The data of communication status includes difference between network switching service and packet switching service and a number of calls classified in accordance with category of contents of provided service. The provided service means a packet service or the like presented at a transfer rate of 64 Kbps (Kilo bit per second).

Handover Required Message D11 is formed into Handover Request Message D12 in the mobile-service switching center 12b. Handover Request Message D12 is received by the base station controller 20c as a handover destination. The base station controller 20c responds to the mobile-service switching center 12b with Handover Request Ack Message D13 containing data indicative of a number of calls allowable to continue and service contents, based on the state of congestion and capacity of the base station.

Handover Request Ack Message D13 is formed into Handover Command Message D14 in the mobile-service switching center 12b. Then, Handover Command Message D14 is sent to the base station controller 20b. The base station controller 20b receives Handover Command Message D14. Then, the base station controller 20b edits Special message (Notification) D15 for notification containing data indicative of the number of calls allowable to continue, and transmits the same to the subscriber. This process includes the following three steps, for example.

(4-1) The base station controller 20b transmits a handover command message containing alarming message which can be displayed on the display screen of the multicall communication mode supporting terminal 10 under handover.

(4-2) The base station controller 20b transmits a special message for notification. The way to transmit the message may be the same s that of a single call processing message or new special message.

(4-3) The base station controller 20b edits a short message and transmits the same. At this time, a subscriber, who receives the messages with his or her mobile station and informed of the messages by means of the display screen of the station, selects a call identifier corresponding to a desired call to continue (see FIG. 3) and responds to the base station 20b with Reply Message (Acknowledgement) D16.

The base station controller 20b receives Reply Message D16, edits Call-number Decimation Request Message D17 based on the contents of Reply Message D16, and transmits Call-number Decimation Request Message D17 to the mobile-service switching center 12b. Thereafter, the station controller 20b awaits completion of the decimation process. If the number of calls is decreased to a number allowable to carry out handover, the handover rearrangement is executed in an ordinary manner, as shown in a portion of the diagram attached with reference D18.

As described above, even if the base station controller 20b detects the occurrence of handover or the like, a plurality of calls can be managed based on priority of each call. Therefore, it becomes possible to continue a call selected by the subscriber.

(D) Description of Fourth Embodiment of the Present Invention

According to the present embodiment, there is proposed a variation in selecting a call to be disconnected. Also, the overall arrangement of the mobile communication system of the present embodiment is substantially the same as that of the mobile communication system 9 shown in FIG. 1. Thus, the overall arrangement of the mobile communication system of the present embodiment will not be described.

Figure 9B:
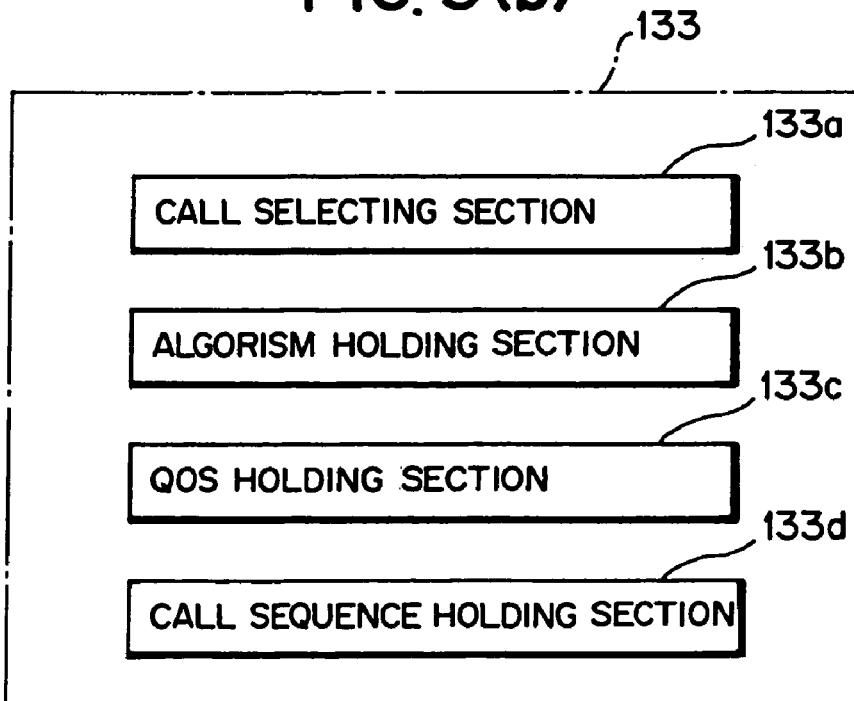

FIG. 9(b) is a diagram showing in a block form the function of call-number changing section according to the fourth embodiment of the present invention. The call-number changing section 133 shown in FIG. 9(b) is a function unit for changing the number of calls handled by the multicall communication mode supporting terminal 10 which is identified as such a terminal by the determining section 30 (see FIG. 5) when any event is detected by the event detecting section 31 (see FIG. 5). The call-number changing section 133 is arranged to include call selecting section 133a, algorism holding section 133b, QOS holding section 133c and call sequence holding section 133d.

In this case, the call selecting section 133a is a function unit for selecting a call to be disconnected based on information contained in a predetermined region of the call disconnect message. The algorism holding section 133b is a function unit for holding algorism for selecting a call. Further, the QOS holding section 133c is a function unit for holding a value indicative of Quality of Service, or the degree of the transmission signal, and the call sequence holding section 133d is a function unit for holding data indicative of an order of requested calls. These functions can be implemented by a software, for example. The QOS holding section 133c and the call sequence holding section 133d will be described in the following description of a second modification of the fourth embodiment.

Figure 18:
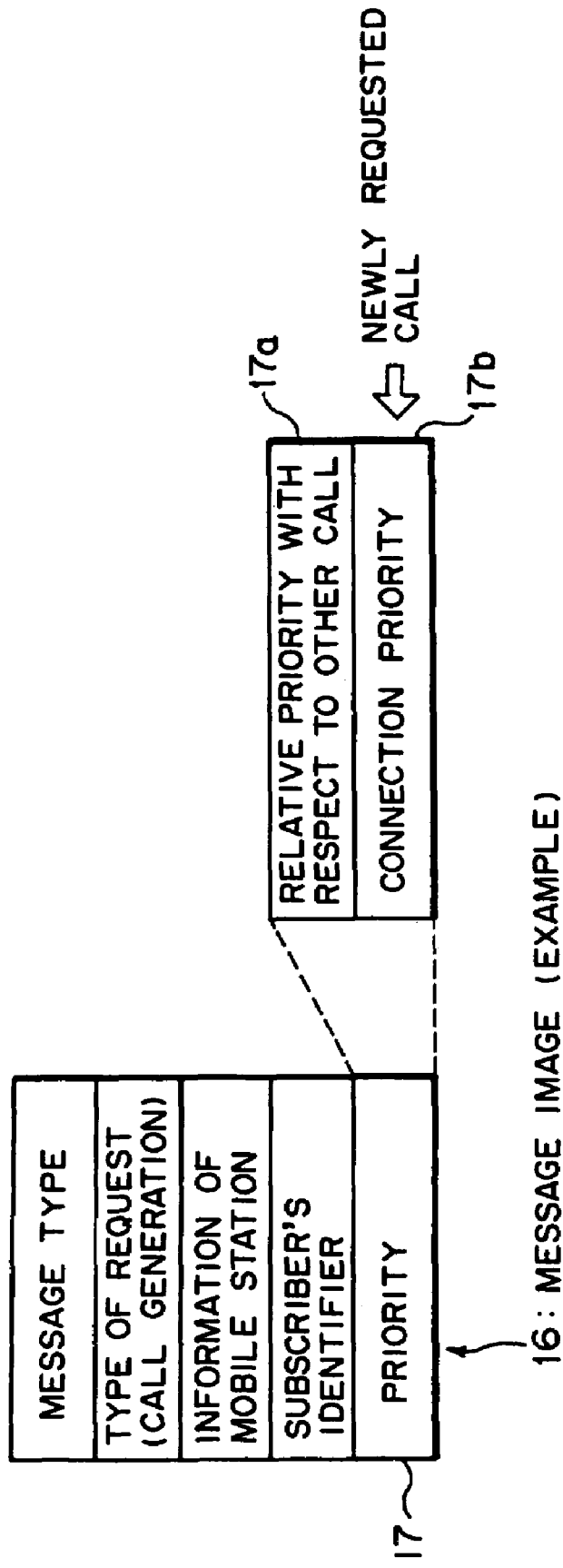
FIG. 18 is a schematic illustration of a data structure of a message exchanged between system components according to the fourth embodiment of the present invention.

FIG. 18 is a diagram illustrative of an image of an arrangement of message data according to the fourth embodiment of the present invention. The message image 16 shown in FIG. 18 illustrates representative portions of Call management Service Request Message (CM Service REQ Message). The message image 16 includes, in addition to data indicative of the type of message, Priority Region 17. Priority Region 17 is composed of Relative Priority Region 17a and Connection Priority Region 17b.

Relative Priority Region 17a is data indicative of a relative priority of its own relative to that of other's call. Connection Priority Region 17b is a region for recording relative priority among a plurality of calls continuing on its own terminal. For example, the relative priority recorded on Connection Priority Region 17b may be relative values assigned to respective connection accounts such as a voice signal call, an internet connection, a FAX communication, in this order, which are registered by the subscriber based on his or her expectation of use.

That is, according to the data arrangement, a parameter region for storing therein parameter of the existing message format is expanded, a region for Connection Priority Region 17b is provided in addition to a region for Relative Priority Region 17a. The mobile station 10 settles a relative priority with respect to priority of other communication channel into the region of Connection Priority Region 17b upon making a call request, and transmits the call request message together with the relative priority data.

When the mobile station 10 receives a call, the mobile station extracts not only data of relative priority with respect to that of others from the priority region 17 but also contents of Connection Priority Region 17b which can be obtained by expanding the parameter portion.

The message image 16 is merely one example when the call selection is effected based on the category of the communication channels. Therefore, the regions may be variably arranged depending on the plan of design.

Operation of the switching center system taken place in response to the handover according to the present embodiment arranged as above will hereinafter be described with reference to a flowchart shown in FIG. 19 and a signaling sequence shown in FIG. 20.

Figure 19:
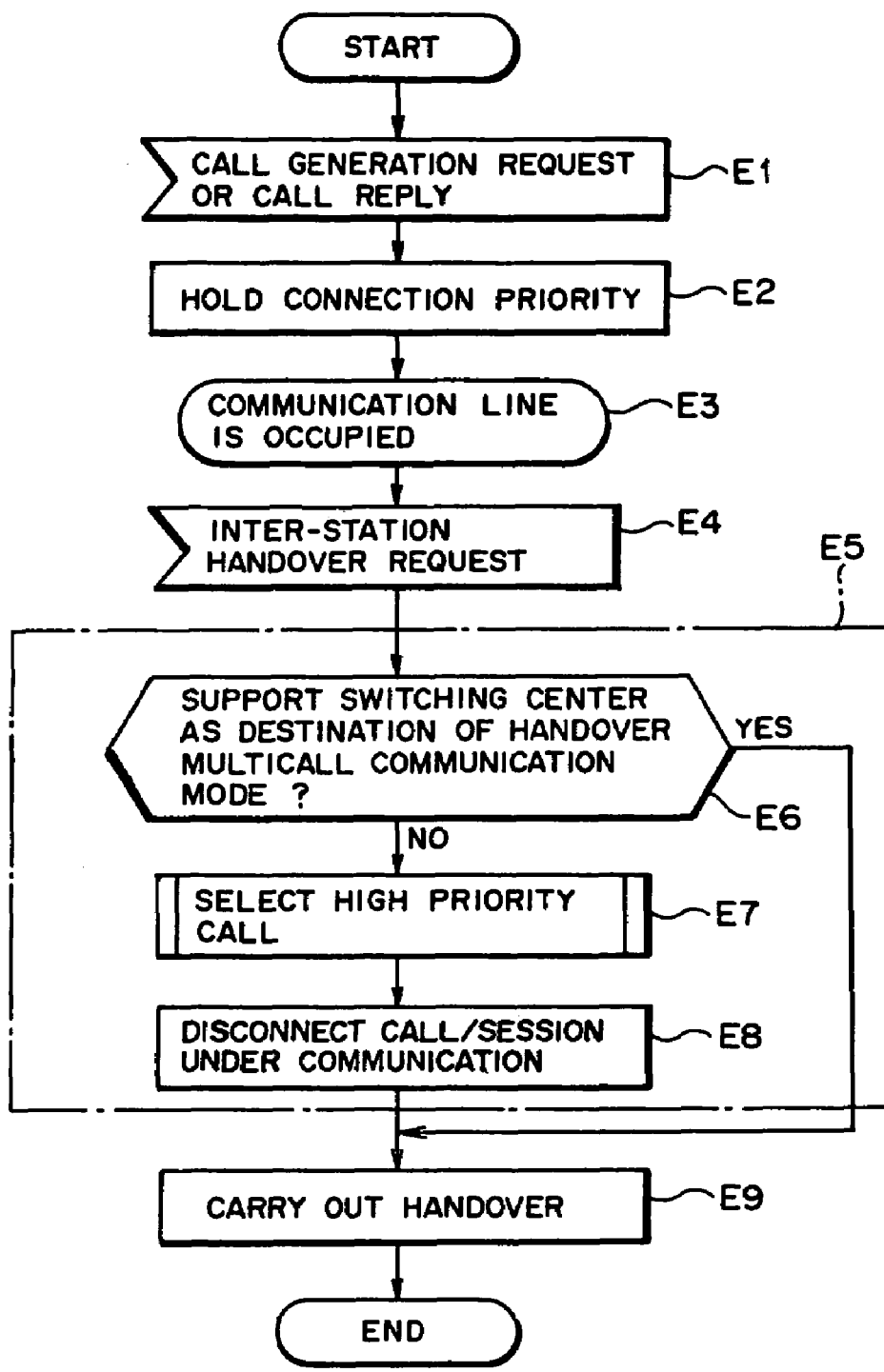
FIG. 19 is a flowchart showing the mobile-service switching center according to the fourth embodiment of the present invention.

FIG. 19 is a flowchart showing a processing carried out in the mobile-service switching center 12b according to the fourth embodiment of the present invention. Initially, when the mobile-service switching center 12b receives a message of a call request or a message of call reply from a subscriber (step E1), the mobile-service switching center 12b holds data of connection priority contained in the messages during the communication (step E2). The mobile-service switching center 12b is brought to the communication mode (step E3). When the mobile-service switching center 12b receives a message of request of handover between stations (step E4), the mobile-service switching center 12b examines whether the base station controller 20c as a handover destination supports the multicall communication mode or not at step E6. If it is determined that the base station controller 20c supports the multicall communication mode, then YES route is taken. At step E9, the handover processing is carried out. Conversely, if it is determined that the base station controller 20c does not support the multicall communication mode, then NO route is taken and processing proceeds to step E7. In the flowchart shown in FIG. 19, a portion attached with reference E5 is a portion for determining the multicall support.

Successively, the mobile-service switching center 12b carries out selection processing so as to select a high priority call (step E7), disconnects a call/session under communication (step E8) and executes handover operation (step E9). Thus, the processing is completed.

Figure 20:
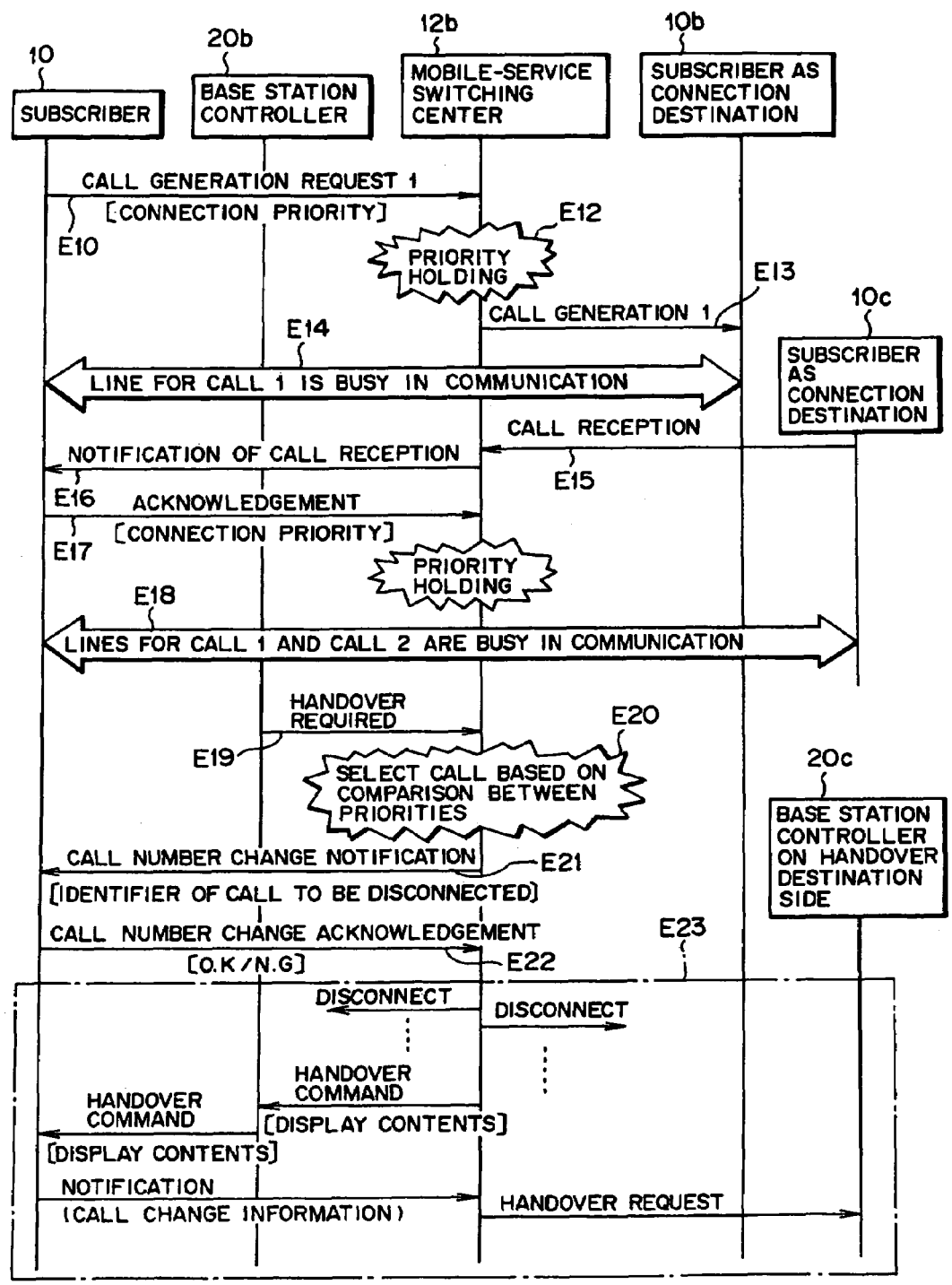
FIG. 20 is a diagram showing a signaling sequence of handover according to the fourth embodiment of the present invention.

FIG. 20 is a diagram showing a signaling sequence according to the fourth embodiment of the present invention. As shown in FIG. 20, the sequence includes signal exchange among the subscriber (mobile station 10), the base station controller 20b, the mobile-service switching center 12b, and a subscriber as a connection destination (mobile station 10b or 10c). Further, the sequence includes processing contents (E12, E14, E18, E20, E23) and names of messages (E10, E13, E15, E16, E17, E19, E21, E22).

Initially, the mobile station 10 transmits Call Generation Request Message E10 (call request 1) to the mobile-service switching center 12b. The mobile-service switching center 12b holds the data indicative of priority contained in the message (portion attached with reference E12), and transmits Call Generation Message E13 to the subscriber as the connection destination (mobile station 10b). Thus, communication line is established between the mobile station 10 and the mobile station 10b (portion attached with reference E14).

Further, other subscriber (mobile station 10c) transmits another Call Request Message (Call Reception) E15 to the mobile-service switching center 12b. The mobile-service switching center 12b transmits Call Reception Message (Notification) E16 to the mobile station 10. At this time, the mobile station 10 transmits Acknowledgement Message E17 to the mobile-service switching center 12b. The mobile-service switching center 12b holds the priority. Thus, communication line is established (with call 1 and call 2) between the mobile station 10c and the mobile station 10 (portion attached with reference E18).

When the base station controller 20b detects any environmental change such as the necessity of handover, for example, the base station controller 20b transmits Handover Required Message E19 to the mobile-service switching terminal 12b, and the mobile-service switching center 12b receives Handover Required Message E19, then the mobile-service switching center 12b examines whether the calls continued can be maintained or not under the current communication status.

If the mobile-service switching center 12b determines that the continuation of the calls are not allowable, the mobile-service switching center 12b effects comparing operation on all of the calls in terms of the connection priority before executing handover. Thus, the mobile-service switching center 12b selects a calls allowable to continue having a high priority (step E20).

Further, the mobile-service switching center 12b edits Special Message E21 for call-number change notification and transmits the same to the mobile station 10. In this case, the special message may be a single call processing message or a new special message.

The mobile station 10 receives Message E21. Then, the user (subscriber) of the mobile station 10 confirms the display screen of the mobile station 10. If the user agrees with the contents of the display screen presented by the mobile-service switching center 12b, then the user responds with a consent message, or Call-Number Change Reply Message (Call-Number Change Acknowledgement) E22 having an indication of OK inserted therein. Conversely, if the user does not agree with the contents of the display screen presented by the mobile-service switching center 12b, then the user responds with a refuse message, or Call-number Change Reply Message E22 having an indication of NG inserted therein.

If the mobile-service switching center 12b receives the refuse message, the mobile-service switching center 12b refuses the handover operation. On the other hand, if the mobile-service switching center 12b receives the consent message, as the processing surrounded with a frame and attached with reference E23, calls other than the selected calls are forcibly disconnected and executes handover operation to the base station controller 20c as the handover destination.

As described above, according to the above method, information indicative of call priority can be exchanged without changing the existing message format. Therefore, the method can be widely utilized and extendability thereof can be improved.

(D1) Description of a First Modification of the Fourth Embodiment of the Present Invention According to the present modification, when a call to continue is selected, the call selecting section shown in FIG. 9(b) selects a call based on information contained in the subscriber's data which is sent from the HLR 13 to the VLRs 106a to 106c.

Figure 21:
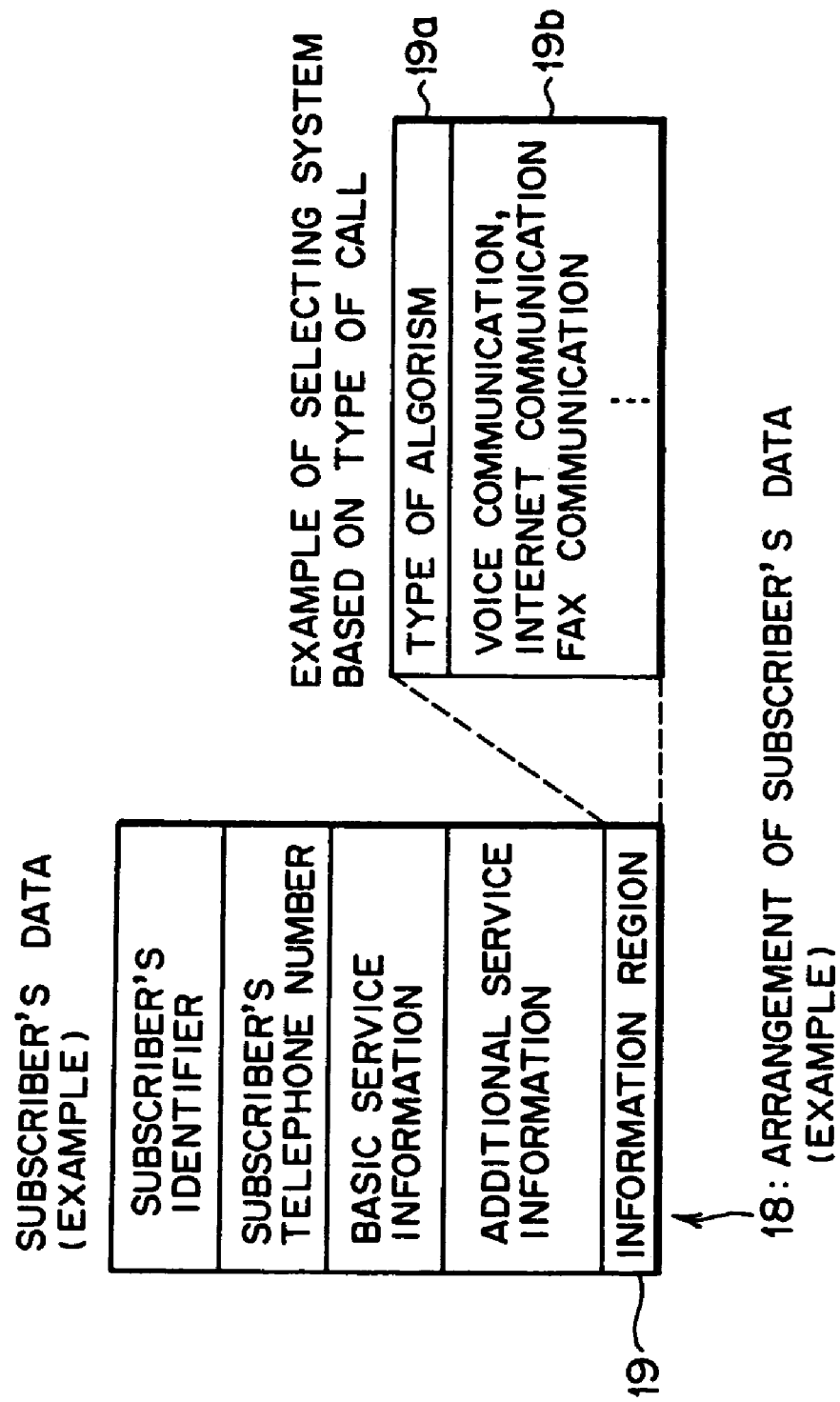
FIG. 21 is a schematic illustration of a subscriber's data structure of a message exchanged between system components according to a first modification of the fourth embodiment of the present invention.

FIG. 21 is a diagram schematically illustrating the arrangement of subscriber's data according to the first modification of the fourth embodiment of the present invention. The subscriber's data 18 shown in FIG. 21 is data sent from the HLR 13 to each of the VLRs 106a to 106c. The data contains an information region 19, in addition to subscriber's identifier or the like.

In this case, the VLRs 106a to 106c are provided for one or more switching centers 12a to 12c. The VLRs 106a to 106c temporarily holds the subscriber's information such as location of the subscriber. With this arrangement, when the mobile station 10 moves from one zone governed under one of the switching centers 12a to 12c to another zone governed under another one of the switching centers 12a to 12c, the switching centers 12a to 12c can cope with the subscriber's information or the like of the mobile station 10 without accessing the HLR 13. Further, in actual practice, the VLRs 106a to 106c are provided for every switching center 12a to 12c. For example, the switching center 12a and the VLR 106a are operated in a cooperative manner to carry out network management (the switching center 12a and the VLR 106a can be regarded as an integral unit and hence hereinafter sometimes denoted as MSC/VLR). Thus, the subscriber's information or the like can be managed. Similarly, the switching center 12b and the VLR 106b are operated in a cooperative manner and the switching center 12c and the VLR 106c are operated in a cooperative manner, whereby management function can be implemented.

The unit of MSC/VLR is arranged to carry out location management in an LA (Location Area). In this case, the term LA is a concept inclusive of a cell, or formed of a plurality of cells and attached with an identifier of a location registration area. Further, the timing at which the data held in the HLR is updated is only when the mobile station 10 moves from one zone governed under one of the VLRs 106a to 106c to another zone governed under another one of the VLRs 106a to 106c. If the mobile station 10 moves between cells, access to the switching centers 12a to 12c will not taken place.

For example, if the mobile station 10 moves from one zone governed under the switching center 12a to another zone governed under the switching center 12b, the data contents of the HLR 13 is updated by way of the VLR 106b. Then, the HLR 13 replaces the old data recorded in the VLR 106a with new one. Conversely, if the mobile station 10 moves from one zone governed under the switching center 12b to another zone governed under the switching center 12c, the data contents of the HLR 13 is not updated.

In this way, according to the above arrangement, the location registration can be carried out wherever the mobile station 10 is located. Further, when the network receives a call request from any mobile station 10, the network side need not search the areas for the mobile station 10 by using all of the switching centers 12a to 12c. Therefore, the network can provide communication service more effectively. Moreover, the switching center 12b can acquire information of the subscriber.

The information region 19 contained in the subscriber's data 18 includes algorism type region 19a indicative of the type of algorism for selecting calls to continue and a registration section selecting section 19b for registering the type of algorism into HLR 13. This algorism is provided at the unit of subscriber. Therefore, the calls made by the mobile station 10 can be selected in accordance with the telephone number (area code) beginning with 044, for example.

Accordingly, the call selecting section 133a (see FIG. 9(b)) selects a call to be disconnected based on the selecting algorism prepared for each subscriber. Further, if a call selecting algorism settled by the subscriber is utilized for call selection, a message meaning this intention is sent to the HLR 13. Furthermore, when the location registration is carried out by an existing method, the message is added with new data as a part of the subscriber's data and sent to the mobile-service switching center 12b.

Figure 22:
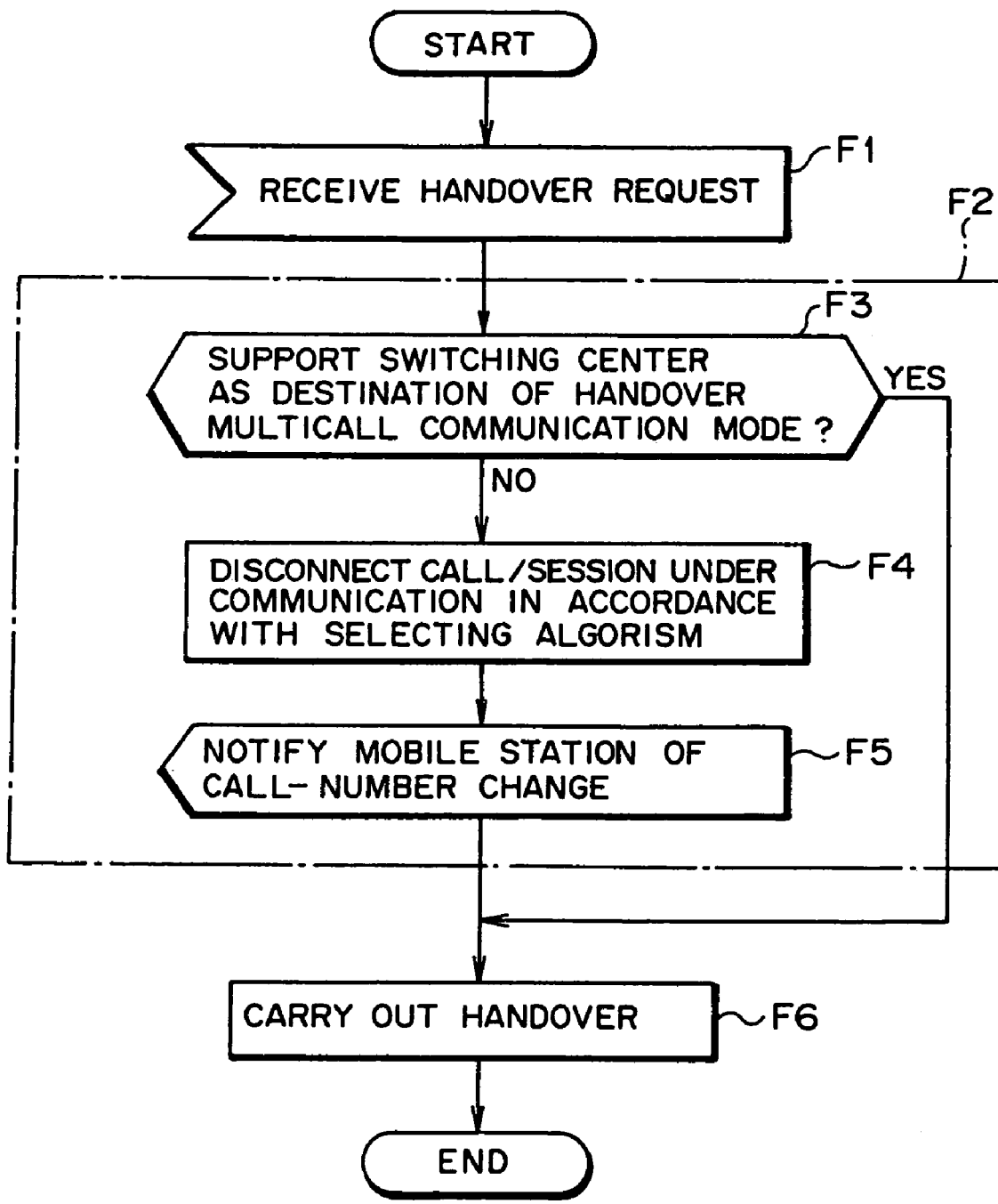
FIG. 22 is a flowchart showing the mobile-service switching center according to the first modification of the fourth embodiment of the present invention.

How the switching center system arranged as described above responds to the occurrence of handover in the present modification will hereinafter be described with reference to a flowchart of FIG. 22. FIG. 22 is the flowchart illustrative of a processing carried out in the mobile-service switching center 12b (denoted as Switching Center) according to the first modification of the fourth embodiment of the present invention.

Initially, when any environmental change such as the necessity of handover is taken place and the mobile-service switching center 12b receives a message of handover request (step F1), the mobile-service switching center 12b examines whether the base station controller as the handover destination supports the multicall communication mode or not at step F3. Thus, the mobile-service switching center 12b determines whether the current calls can be continued while maintaining the current communication status. If it is determined that the base station controller as the handover destination supports the multicall communication mode, then YES route is taken and handover is executed (step F6). Thus, the processing is completed. In the flowchart of FIG. 22, a portion attached with reference F2 represents a processing for determining whether the base station controller as the handover destination supports the multicall communication mode or not.

Conversely, at step F3, if it is determined that the base station controller as the handover destination does not support the multicall communication mode, all of the current calls cannot be continued, and hence NO route is taken to proceed to step F4.

At step F4, before executing the handover operation, the mobile-service switching center 12b selects a call to be disconnected in accordance with the selection algorism contained in the subscriber's data and disconnects the call not allowable to continue. Then, the mobile-service switching center 12b edits a special message for notification and transmits the same to the subscriber. In this case, the method may deal with a call processing message of a single call or a new special message.

The mobile-service switching center 12b may edit a short message and transmit the same. In that case, the mobile-service switching center 12b decimates or disconnects the sessions under communication. At step F5, the mobile-service switching center 12b transmits call-number change information to the subscriber. Thereafter, the mobile-service switching center 12b executes handover at step F6 and the processing is completed.

In this way, according to the above modification, since calls can be managed in accordance with the selection algorism, communication service can be managed with accuracy.

(D2) Description of a Second Modification of the Fourth Embodiment of the Present Invention Also in the present modification, the call selecting section 133a selects a call to be disconnected based on the selection algorism prepared for each subscriber. The following is a description on two kinds of the selection algorism proposed.

A first mode of the selection algorism is as follows. That is, the call to continue is selected based on priority which is determined in accordance with the connection sequence of a plurality of calls under communication. For example, a call connected at first is selected as a call to continue with the highest priority.

In more concretely, the call order holding section 133d (see FIG. 9(b)) holds the order of plurality of requested calls, and the call selecting section 133a assigns a number to all of the calls, whereby all of the calls can be managed. When a request of handover is brought about, the call allowable to continue is selected based on the number. Further, the number is stored as a part of data managed with an existing format.

Figure 23:
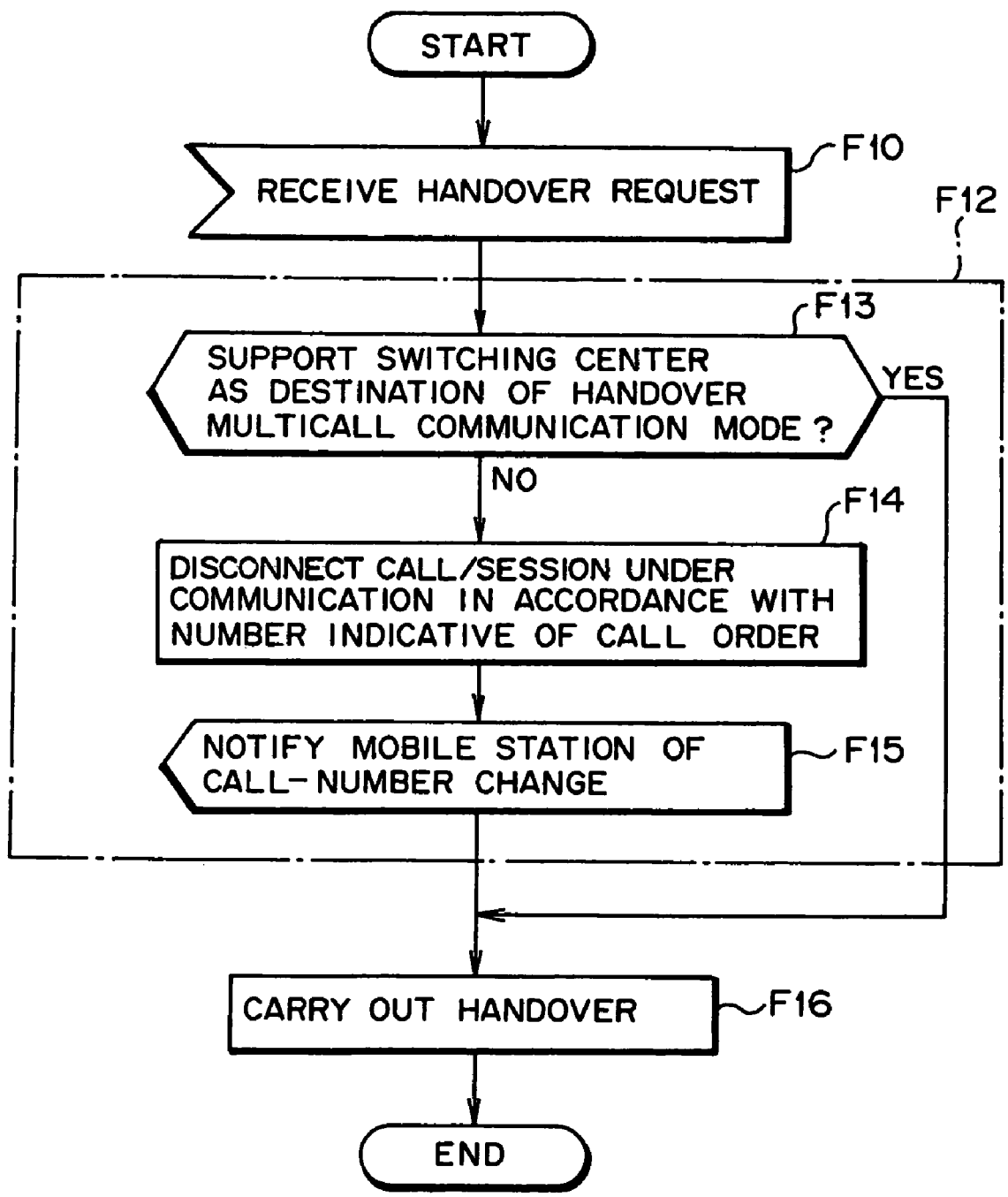
FIG. 23 is a flowchart showing the mobile-service switching center according to a second modification of the fourth embodiment of the present invention.

How the switching center system arranged as described above responds to the occurrence of handover in the present modification will hereinafter be described with reference to a flowchart of FIG. 23. FIG. 23 is the flowchart illustrative of a processing carried out in the mobile-service switching center 12b (denoted as Switching Center) according to the second modification of the fourth embodiment of the present invention.

In this case, when call request is made in an ordinary manner, the subscriber need not carry out any special operation. However, if some environmental change such as the necessity of handover is brought about and the mobile-service switching center 12b receives a message of handover request (step F10), the mobile-service switching center 12b examines whether the base station controllers 20a to 20c as the handover destination support the multicall communication mode or not at step F13. Thus, the mobile-service switching center 12b determines whether the current calls can be continued while maintaining the current communication status. In the flowchart of FIG. 23, a portion attached with reference F12 represents a processing for determining whether the base station controller as the handover destination supports the multicall communication mode or not.

If it is determined that the base station controller such as the base station controller 20a supports the multicall communication mode, then YES route is taken and the mobile-service switching center 12b executes the handover operation (step F16). Thus, the processing is completed. Conversely, at step F13, if it is determined that the base station controller 20a as the handover destination does not support the multicall communication mode, before executing the handover operation, the mobile-service switching center 12b selects a call allowable to continue in accordance with the connection order based on the number of calls allowable to continue and disconnects the rest of calls not allowable to continue (step F14) (call order). Then, the mobile-service switching center 12b edits a special message for notification and transmits the same to the subscriber (step F15). In this case, the method may deal with a call processing message of a single call or a new special message. Further, the mobile-service switching center 12b edits a short message and transmits the same to the mobile station 10. Thereafter, the mobile-service switching center 12b executes the handover operation (step F16) and the processing is completed.

According to the second mode of the second modification, the call selecting section 133a selects a call to continue based on a QOS value indicative of the grade of a transmission signal. In more concretely, the QOS holding section 133c (see FIG. 9(b)) holds values of QOS and a call with the largest QOS value is selected as a call allowable to continue. That is, at the above-described step F14, a call allowable to continue is selected based on the order of QOS value of the plurality of calls.

In this case, when call request is made in an ordinary manner, the subscriber need not carry out any special operation. However, if some environmental change is brought about and the mobile-service switching center 12b receives a message of handover request (step F10), the mobile-service switching center 12b examines whether the current calls can be continued while maintaining the current communication status (step F13). If it is determined that the base station controller supports the multicall communication mode, then YES route is taken and the mobile-service switching center 12b executes the handover operation (step F16). Thus, the processing is completed.

Conversely, if it is determined that the base station controller 20a as the handover destination does not support the multicall communication mode (step F13), before executing the handover operation, then No route is taken, the mobile-service switching center 12b selects a call allowable to continue in accordance with the order of QOS based on the number of calls allowable to continue and disconnects the rest of calls not allowable to continue (step F14). Then, the mobile-service switching center 12b edits a special message for notification and transmits the same to the subscriber (step F15). In this case, the method may deal with a call processing message of a single call or a new special message. Further, the mobile-service switching center 12b edits a short message and transmits the same to the subscriber. Thereafter, the mobile-service switching center 12b executes the handover operation (step F16) and the processing is completed.

As described above, the call selecting section 133 selects a call to be disconnected based on the selection algorism prepared for each subscriber. Therefore, the network can be controlled so as to satisfy the needs of subscriber.

Moreover, when a subscriber makes communication in the multicall communication mode and handover request is brought about or the congesting state of the network is fluctuated, with the result that only a single call or a number of calls smaller than the current maintained calls are allowable to continue, it becomes possible to continue the desired call designated by the subscriber.

Furthermore, since the subscriber can take an initiative in selecting a call to continue and hence a plurality of calls can be managed based on priority for selecting a call settled by each subscriber, the communication network can provide more advanced connection service based on the multicall communication mode.

(E) Description of a Fifth Embodiment of the Present Invention

Description of the present embodiment will be made on a mode in which a number of calls allowable to continue is extracted when handover request is brought about and then the handover is executed, and a mode in which handover is executed when connection service restriction deriving from the event such as congesting state of the network is relaxed. The overall arrangement of the mobile communication system is substantially the same as that of the mobile communication system 9 shown in FIG. 1. Therefore, the overall arrangement of the mobile communication system of the present embodiment-will not be described.

The first mode of the fifth embodiment of the present invention is such one that when the network comes to provide connection service at more number of calls than currently supporting number of calls, then the network informs all of the subscribers supplied with connection service in the multicall communication mode that the network comes to provide connection service at more number of calls than currently supporting number of calls.

Figure 24:
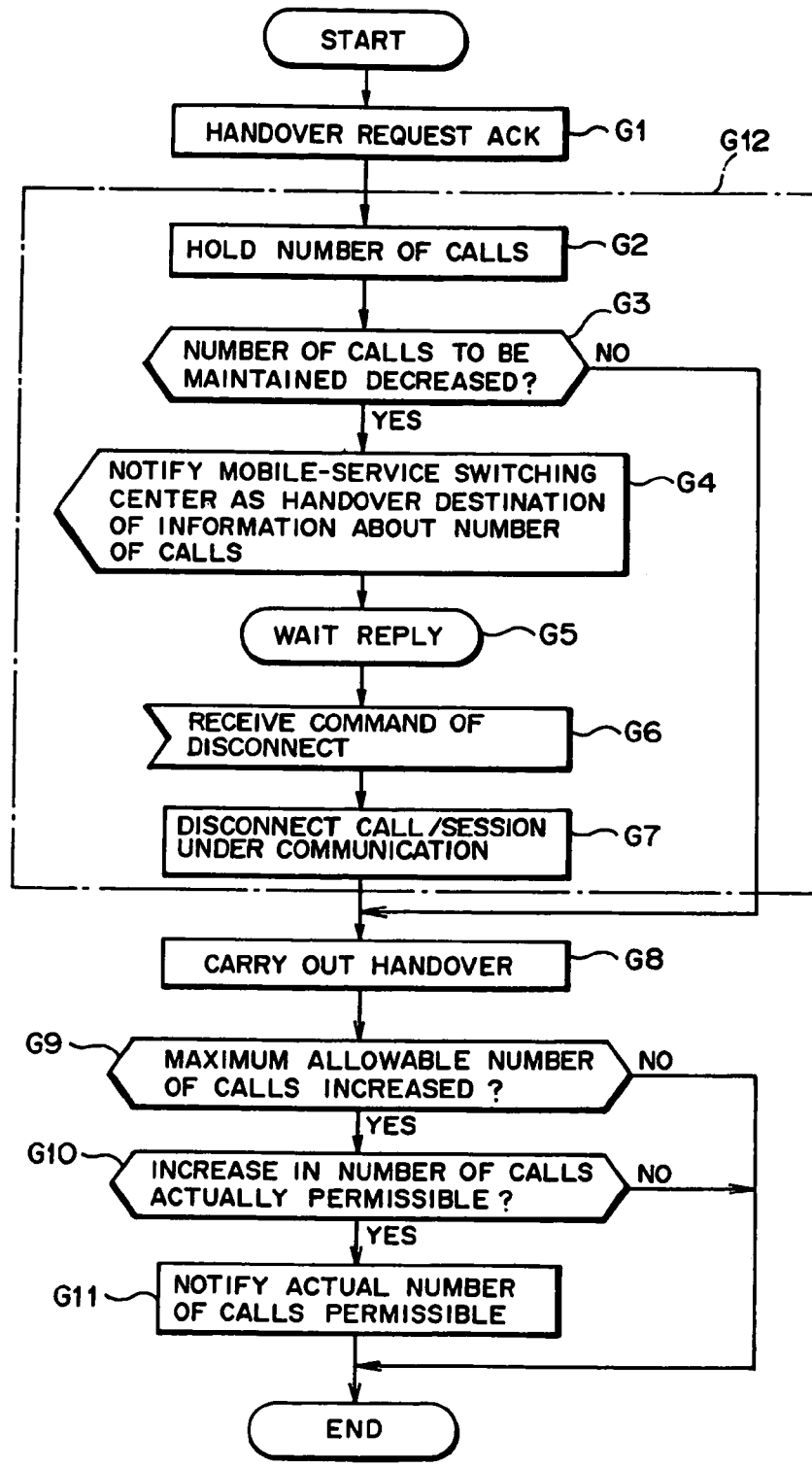
FIG. 24 is a flowchart illustrative of a processing carried out by a mobile-service switching center of a handover source according to a fifth embodiment of the present invention.

FIG. 24 is a flowchart showing a processing carried out in the mobile-service switching center 12b as a handover source according to the fifth mode of the present invention. When the mobile-service switching center 12b receives an acknowledgement of a message of handover request, (Handover Request Ack) (step G1), the mobile-service switching center 12b holds the number of calls (step G2). At step G3, it is determined whether the number of calls to continue is decreased or not. If it is determined that the number of calls to continue is not decreased, NO route is taken and the handover operation is executed at step G8.

Conversely, if it is determined that the number of calls to continue is decreased, YES route is taken. Then, at step G4, the mobile-service switching center 12b transmits information that the number of calls to continue is decreased, to the mobile-service switching center 12c as the handover destination. Further, the mobile-service switching center 12b awaits a reply from the base station controller 20c as the handover destination (step G5). When the mobile-service switching center 12b receives a command of disconnecting a call (step G6) the mobile-service switching center 12b disconnects a call/session under communication (step G7) and executes the handover operation (step G8). In the flowchart of FIG. 24, a portion attached with reference G12 represents a processing executed when the number of calls to continue is decreased.

At step G9, the mobile-service switching center 12b examines whether the maximum number of calls to continue is increased or not. If it is determined that the number of calls is increased, YES route is taken. At step G10, it is examined whether the number of calls can be increased or not. If it is determined that the number of calls can be increased, YES route is taken and the processing is completed at step G11. The mobile-service switching center 12b employs an anchor system. Therefore, even if the handover operation has been carried out, the mobile-service switching center 12b continuously serves as a call processing switching center. Thus, it is again necessary to confirm the congesting state or the capacity of the mobile-service switching center 12b.

Conversely, at steps G9 and G10, if it is determined that the number of calls is not increased, NO route is taken and the processing is completed.

The following is a description on a method of changing the number of calls in the multicall communication mode when handover of the communication line of the first multicall communication mode supporting terminal 10 is executed from the base station controller 20b to the base station controller 20c, by using the above-described arrangement, for example.

Figure 25:
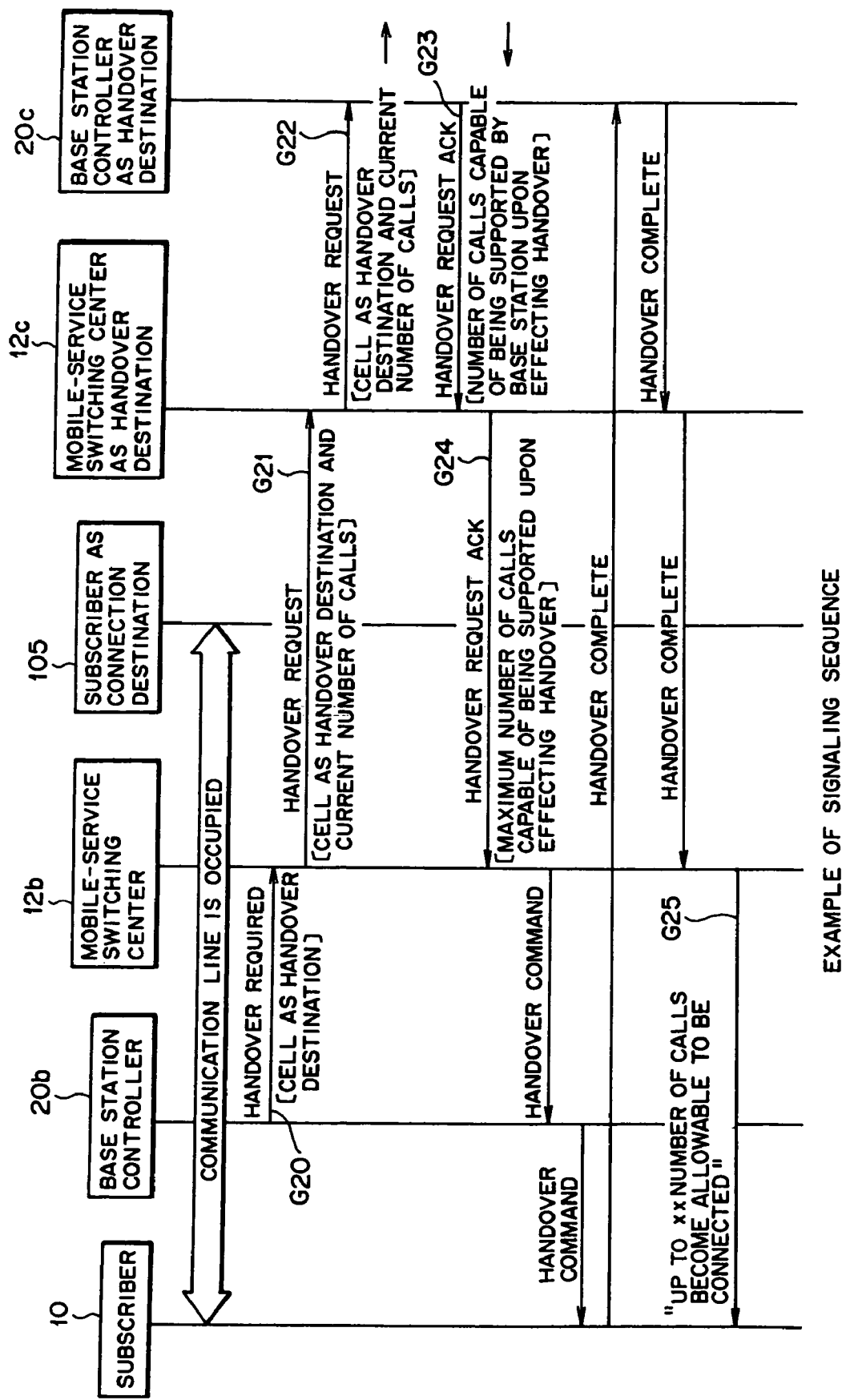
FIG. 25 is a diagram showing a signaling sequence of handover according to the fifth embodiment of the present invention.

FIG. 25 is a diagram showing a signaling sequence upon handover according to the fifth embodiment of the present invention. As shown in FIG. 25, there are contained messages (G20 to G25).

Initially, the base station controller 20b transmits Handover Required Message G20 to the mobile-service switching center 12b. At the same time, the mobile-service switching center 12b transmits Handover Request Message G21 to the mobile-service switching center 12c as a switching center to be connected by the handover (first transmission step). Further, the mobile-service switching center 12c transmits Handover Request Message G22 to the base station controller 20c. Handover Request Message G21 and Handover Request Message G22 are added with data indicative of the current number of calls. The mobile-service switching center 12c and the base station controller 20c receives Handover Request Message G21 and Handover Request Message G22, whereby the mobile-service switching center 12c and the base station controller 20c are informed of the current number of calls.

Successively, the base station controller 20c determines the capacity and congesting state of its own unit and responds to the mobile-service switching center 12c with Handover Request Ack Message G23 having inserted therein data indicative of a number of calls allowable to continue. Thereafter, the mobile-service switching center 12c transmits Handover Request Ack Message G24 containing data indicative of a number of calls allowable to continue based on the capacity and the congesting state of its own unit, to the mobile-service switching center 12b (second transmission step).

If the number of calls allowable to continue, the number is contained in the Handover Request Ack Message G24 sent at the second transmission step, is larger than the current number of calls supported by the mobile station 10, then the mobile-service switching center 12b transmits Message 25 indicative of an additional number of calls allowable to continue from the mobile-service switching center 12b to the mobile station 10 (call-number notifying step).

In more concretely, when the mobile-service switching center 12b receives Handover Request Ack Message G24, the mobile-service switching center 12b extracts data indicative of the number of calls allowable to continue from Handover Request Ack Message G24 and confirm the number of calls allowable to continue. If it is determined that the number of calls allowable to continue is larger than the current number of calls under communication, then the mobile-service switching center 12b notifies the subscriber that the number of calls allowable to continue is larger than the current number of calls under communication, by using the following steps (5-1) to (5-3). Thus, the multicall communication mode supporting terminal 10 displays a message of "up to xx number of calls become allowable to be connected" on its display screen so as to notify the user (subscriber) of the multicall communication mode supporting terminal 10. The three steps for notifying the subscriber are as follows, for example.

(5-1) The base station controller 20b transmits a handover command message containing alarming message which can be displayed on the display screen of the multicall communication mode supporting terminal 10 under handover.

(5-2) The base station controller 20b transmits a special message for notification. The way to transmit the message may be the same s that of a single call processing message or new special message.

(5-3) The base station controller 20b edits a short message and transmits the same.

Now description will be made on a mode in which handover is executed when congesting state of the network is relaxed.

According to this mode, handover is executed regardless of reception of a message of handover request. The mobile-service switching center 12b monitors the degree of congesting state of the network. When the mobile-service switching center 12b detects the relaxation of the congesting state of the network, with the result that the network can provide connection service to a number of calls larger than the current calls under communication, the mobile-service switching center 12b examines the status of the all subscribers under communication. Then, the mobile-service switching center 12b compares the maximum allowable call-number based on the contract between the network manager and each subscriber with the current number of calls under communication for each subscriber. Thus, the mobile-service switching center 12b searches for a subscriber under condition that the current number of calls under communication is smaller than the maximum allowable call-number based on the contract. Further, the mobile-service switching center 12b compares the current number of calls under communication with the maximum number of calls that can be provided as the connection service. Thus, the mobile-service switching center 12b finds a subscriber who can be provided with an additional call as a connection service from the network.

If the mobile-service switching center 12b finds a subscriber who can be provided with an additional call, the mobile-service switching center 12b notifies the subscriber that an additional call can be provided, by using the following steps (6-1) to (6-3).

(6-1) The mobile-service switching center 12b transmits to a mobile station 10 a command message which makes the mobile station 10 emanate a special alarming sound.

(6-2) The base station controller 20b transmits a special message for notification. The way to transmit the message may be the same as that of a single call processing message or new special message.

(6-3) The base station controller 20b edits a short message and transmits the same.

As described above, the call selecting section 133a tries to find a subscriber who can be provided with an additional call as a connection service from the network and the network provides the connection service to the subscriber. Therefore, it becomes possible to provide more advanced service to the subscriber.

Furthermore, since the subscriber can take an initiative in selecting a call to continue and hence a plurality of calls can be managed based on priority for selecting a call settled by each subscriber, the communication network can provide more advanced connection service based on the multicall communication mode.

(E1) Description of a First Modification of the Fifth Embodiment of the Present Invention According to the first modification of the fifth embodiment of the present invention, the subscriber's data (see FIG. 21) is additionally provided with data of Flag indicating that the number of calls provided to the subscriber as a communication service becomes a target of decimation. That is, at the call-number notifying step, the mobile-service switching center 12b transmits to the multicall communication mode supporting terminal 10 which is obliged to decrease the number of calls to continue. The number of calls is corresponding to the calls as a target of decimation, a message forcing the multicall communication mode supporting terminal 10 to resettle the communication lines for the calls. The mobile-service switching center 12b can acquire information regarding the subscriber.

Figure 26:
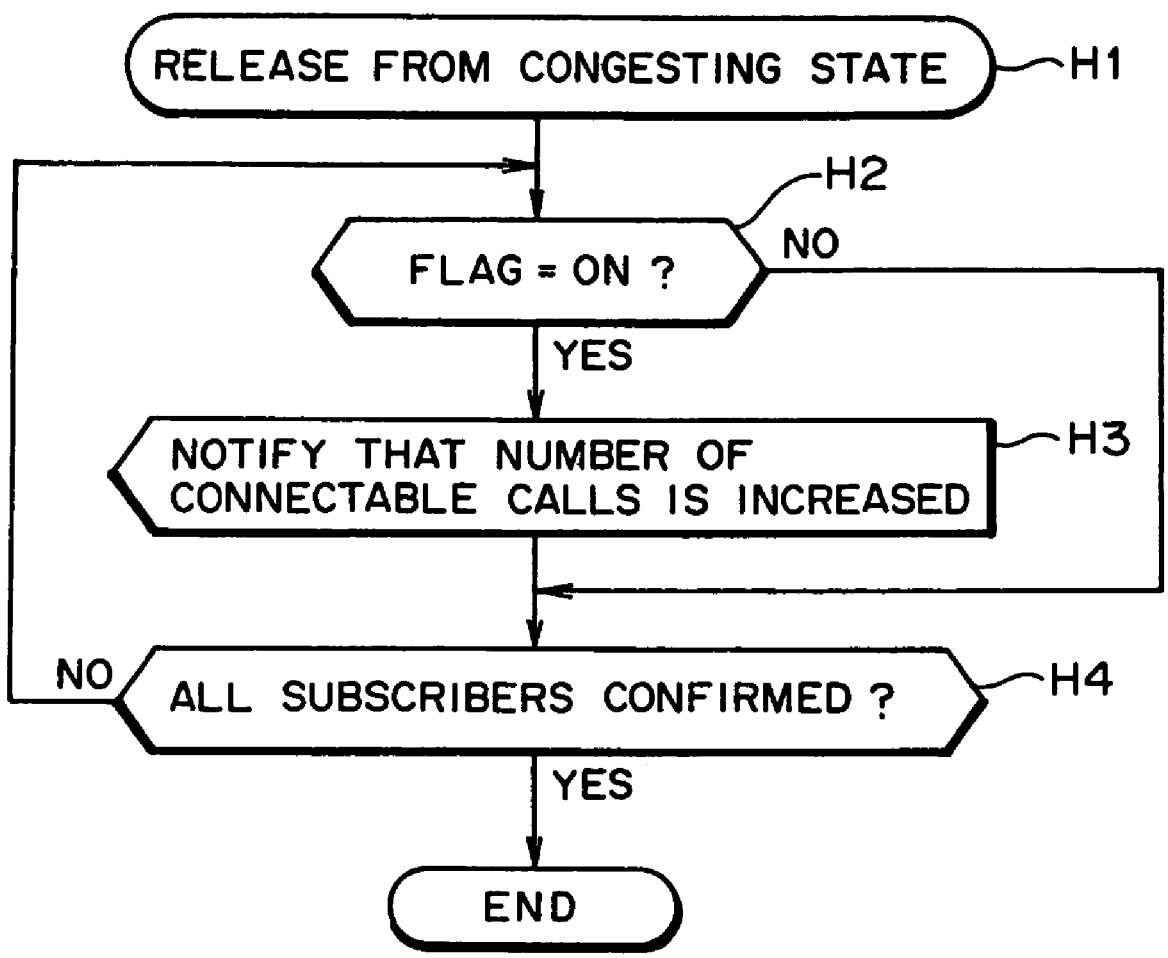
FIG. 26 is a flowchart illustrative of a processing carried out by a mobile-service switching center of a handover source according to a first modification of the fifth embodiment of the present invention.

With this arrangement of the above-described embodiments and modification thereof, when the number of calls under communication is to be changed, the HLR 13 sets a flag indicative of necessity of decimation of calls under communication. FIG. 26 is a flowchart illustrative of a processing carried out in the mobile-service switching center 12b according to the first modification of the fifth embodiment. The processing is carried out when the network is relieved from the congesting state.

Initially, when the congesting state of the network is relaxed or the mobile-service switching center 12b determines that an additional call becomes allowable to provide as a connection service upon occurrence of handover, as explained in the description on the fifth embodiment (step H1), the mobile-service switching center 12b confirms the subscriber's data. At step H2, the mobile-service switching center 12b examines the status of the flag in the subscriber's data. If it is determined that the flag is turned ON in the data, YES route is taken. At step H3, the mobile-service switching center 12b notifies the subscriber corresponding to the ON-status flag that more calls can be provided as a connection service. Further, at step H4, the mobile-service switching center 12b checks the status of the flag of other subscribers. The processing takes NO route at step H4 so long as the mobile-service switching center 12b finds other subscriber having data with the ON-status flag. The processing of steps H2 and H3 is applied to all of the subscribers having data with the ON-status flag. If it is confirmed at step H4 that there is no subscriber having data with the ON-status flag, YES route is taken and the processing is completed.

At step H2, if the mobile-service switching center 12b does not find any subscriber having data with the ON-status flag, NO route is taken and processing of step H4 is executed.

In the above modification, if the network determines that more connection service can be provided to a subscriber who has been obliged to decimate the number of calls under communication, the network may inform the subscriber of the newly created allowance of communication service owing to the release from the congesting state, by any visual or audible section. With this arrangement, handover will be carried out with flexibility.

(E2) Description of a Second Modification of the Fifth Embodiment of the Present Invention The above described call-number notifying step may be arranged such that the mobile-service switching center 12b notifies the mobile station 10 that the communication channel cannot be changed while maintaining the communication status upon the event deriving from the occurrence of the handover and fluctuation of the network congestion state.

The above-introduced method may be utilized when a packet communication is carried out at a transfer rate of 384 Kbps and any event makes it possible to support the communication status merely at a transfer rate of 64 Kbps, for example. In this case, the mobile-service switching center 12b operates substantially similarly to the operation illustrated in FIG. 7.

When the number of calls under communication is to be changed, the mobile-service switching center 12b notifies the subscriber of the contents of change by using the following two steps (7-1) and (7-2). That is, when any event preventing the handover from being executed while maintaining the current communication status is brought about, the mobile-service switching center 12b notifies the subscriber that the handover cannot be carried out while maintaining the current communication status.

(7-1) The base station controller 20b transmits a special message for notification. The way to transmit the message may be the same as that of a single call processing message or new special message.

(7-2) The base station controller 20b edits a short message and transmits the same.

How the switching center system arranged as described above responds to the occurrence of handover in the present modification will hereinafter be described with reference to a signaling sequence of FIG. 27.

Figure 27:
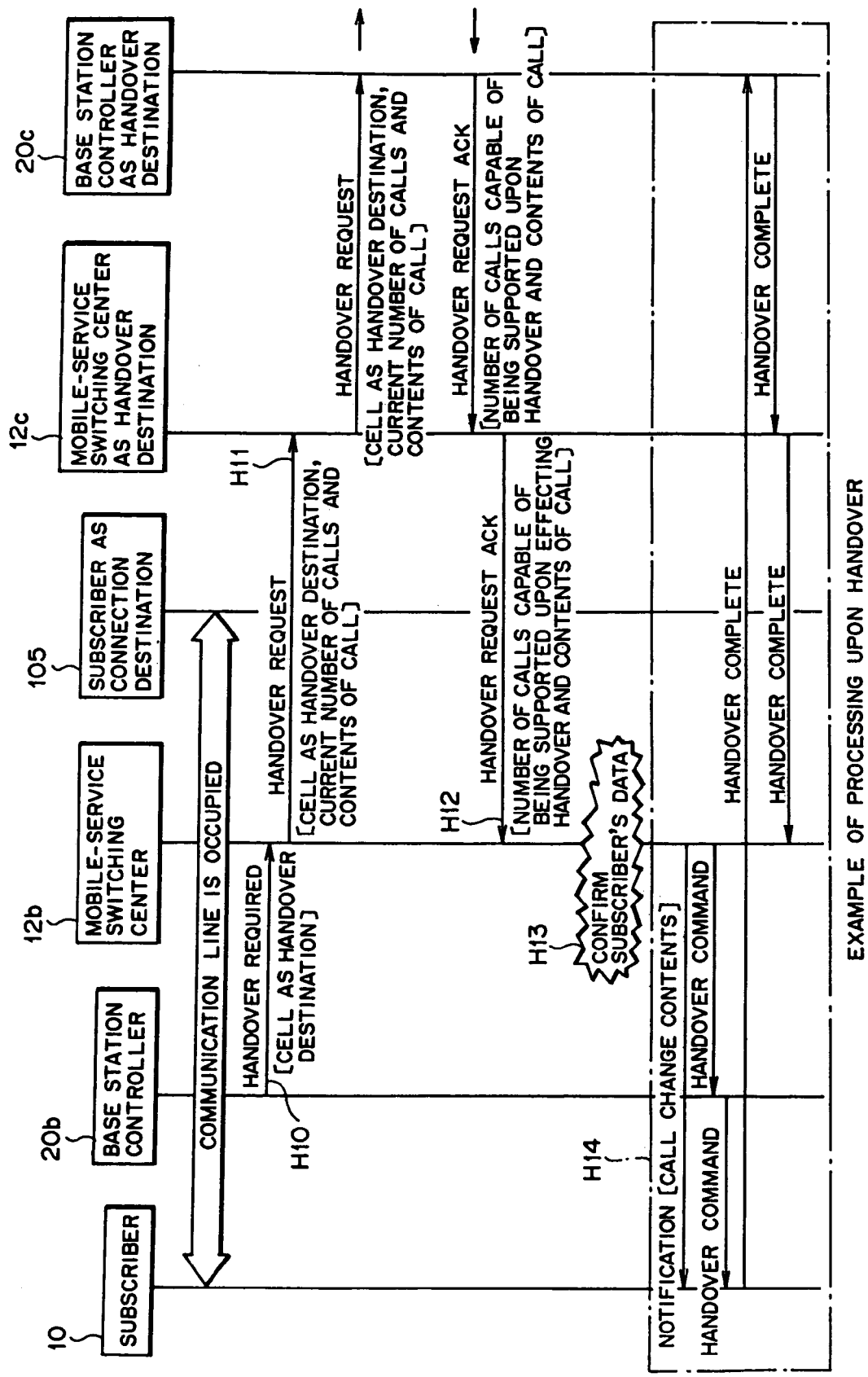
FIG. 27 is a diagram showing a signaling sequence of handover according to a second modification of the fifth embodiment of the present invention.
Figure 28:
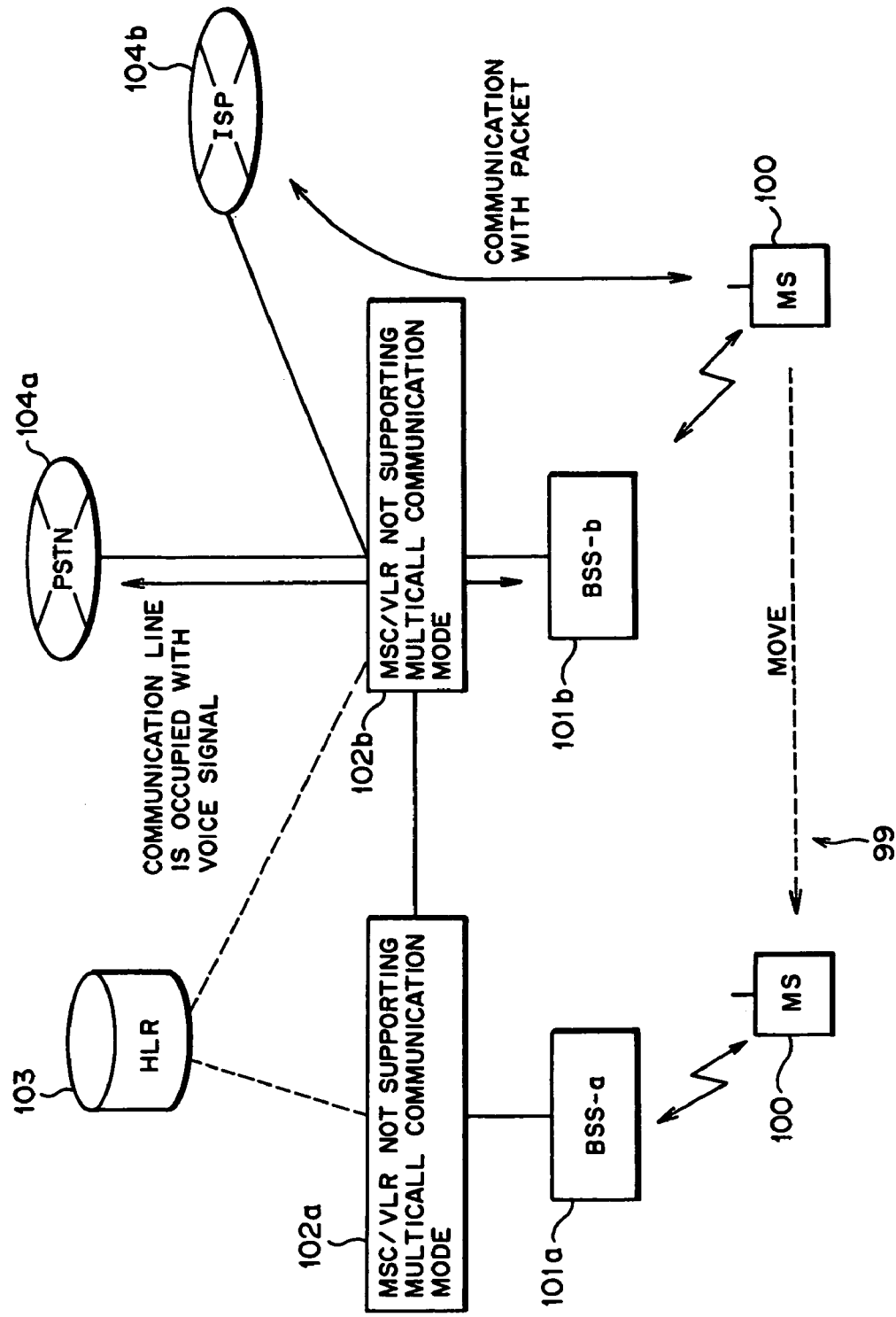
FIG. 28 is a diagram showing a general arrangement of a mobile communication system.
Figure 29:
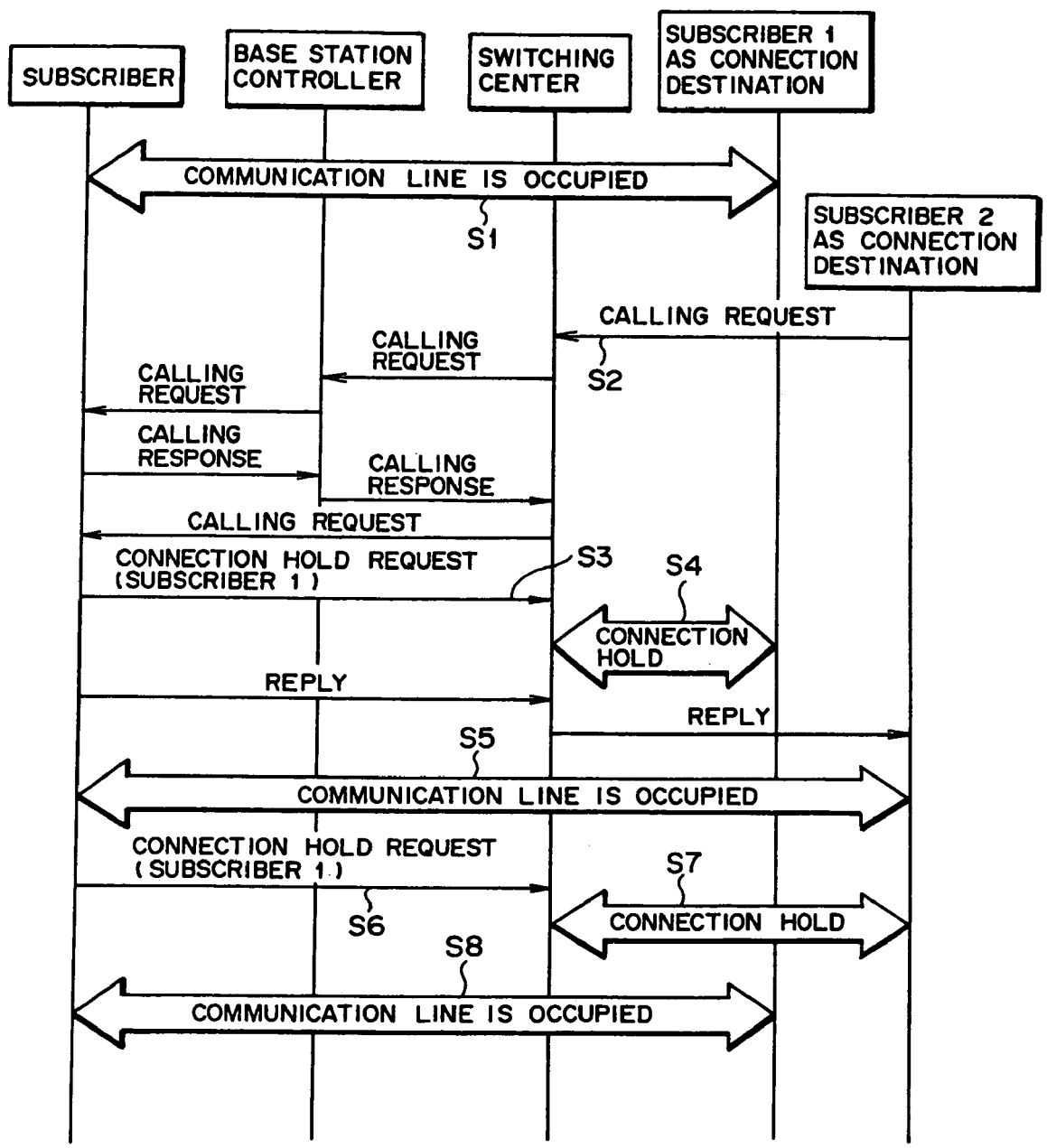
FIG. 29 is a diagram showing an example of a connection sequence when communication in a catch phone mode is carried out.
Figure 30:
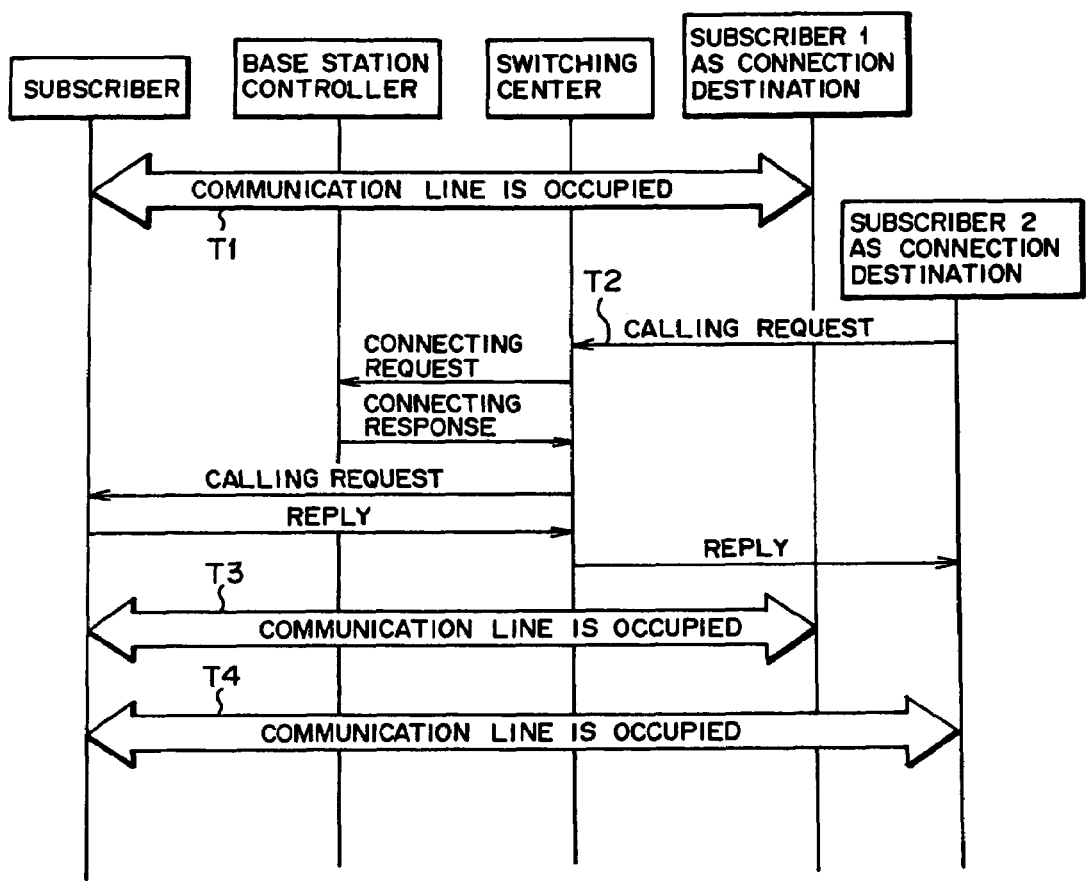
FIG. 30 is a diagram showing an example of a connection sequence when communication in a multisession mode is carried out.

FIG. 27 is a diagram of a signaling sequence of handover according to the second modification of the fifth embodiment of the present invention. Initially, the base station controller 20b shown in FIG. 27 transmits Handover Required Message H10 to the mobile-service switching center 12b. When the mobile-service switching center 12b receives Handover Required Message H10, then the mobile-service switching center 12b transmits Handover Request Message H11 to the mobile-service switching center 12c as a handover destination.

When the mobile-service switching center 12b receives Handover Request Ack Message H12 as a reply of Handover Required Message H10, the mobile-service switching center 12b confirms subscriber's data (step attached with reference H13). Then, as a portion surrounded with a frame attached with reference H14, the handover is carried out.

As described above, when a packet communication is carried out in the network and the transfer rate at which the network can support the communication service is obliged to decrease, the subscriber can be informed that the communication channel switching cannot be executed while maintaining the current communication status. Therefore, the subscriber can be given a chance to take a countermeasure, with the result that any unpredictable trouble can be avoided.

(F) Other Disclosure

The present invention is not limited to the above-described embodiments and modifications thereof, but many variations or modifications can be effected without departing from the gist of the present invention. For example, the above-described flowchart or sequence may contain some changes and variations upon implementing the same.

Further, the number of multicall communication mode supporting terminals to be accommodated in the network may be suppressed to 70 to 80% of the whole number of calls depending on the intention of design of the network.

While in the present invention description has been made on a case where the present invention is applied to a portable telephone network, the present invention may be applied to any other network such as a network of GSM (Global System for Mobile Communications).

For example, while the mobile station 10 in the above description is merely a portable telephone unit, the mobile station 10 may be arranged to have a vibrator in addition to the alarm sound emanating unit. Further, the mobile station 10 may be arranged to have any unit other than a display unit for notifying the user of any information.

Furthermore, in the present invention description has been made on a case where the call selecting section selects a call to continue in accordance with a selection algorism based on one of the priority and the connection order functioning independently. However, the call selecting section may be arranged to select a call to continue in accordance with a selection algorism based on the priority and the connection order functioning cooperatively.

It is noted that the handover request 1 denoted at the lower portion of FIG. 8 represents Handover Required Message while the handover request 2 also denoted at the lower portion of FIG. 8 represents a reply with Handover Required Ack Message.

What is claimed is:

1. A multicall communication mode supporting terminal comprising:

receiving section for receiving a special message regarding the increases and decreases of a plurality of calls and extracting call-number change information from the special message;

presenting section for displaying the plurality of calls under communication which is identified by the call-number changing information extracted by the receiving section, to the user of the multicall communication mode supporting terminal in a visual manner or an audible manner in accordance with the call-number change information extracted by the receiving section;

input section arranged to permit the user of the multicall communication mode supporting terminal to carry out input operation for selecting a desired call to continue from the plurality of calls presented by the presenting section; and transmitting section for transmitting information regarding the desired call to continue which is selected by the input section to a corresponding base station.

* * * * *